US012800802B2

(12) United States Patent
Topliss et al.

(10) Patent No.: US 12,800,802 B2
(45) Date of Patent: Nov. 17, 2026

(54) FLUID-FILLED TUNABLE LENS

(71) Applicant: Apple Inc., Cupertino, CA (US)

(72) Inventors: Richard J Topliss, Cambridge (GB); Matthew D Hollands, Cambridge (GB); James E Pedder, Oxon (GB); Daniel J Burbridge, Cambridge (GB); Thomas M Gregory, Cambridge (GB)

(73) Assignee: Apple Inc., Cupertino, CA (US)

( * ) Notice: Subject to any disclaimer, the term of this patent is extended or adjusted under 35 U.S.C. 154(b) by 216 days.

(21) Appl. No.: 18/740,934

(22) Filed: Jun. 12, 2024

(65) Prior Publication Data

US 2025/0028093 A1 Jan. 23, 2025

Related U.S. Application Data

(60) Provisional application No. 63/612,483, filed on Dec. 20, 2023, provisional application No. 63/514,961, filed on Jul. 21, 2023, provisional application No. 63/514,936, filed on Jul. 21, 2023.

(51) Int. Cl.
*G02B 3/12* (2006.01)
*G02B 3/14* (2006.01)

(52) U.S. Cl.
CPC *G02B 3/12* (2013.01); *G02B 3/14* (2013.01)

(58) Field of Classification Search
None
See application file for complete search history.

(56) References Cited

U.S. PATENT DOCUMENTS 6,318,857 B1 * 11/2001 Shirayanagi ........... G02C 7/085 351/158
7,826,145 B2 11/2010 Justis et al.
7,977,827 B2 7/2011 Li et al.
7,986,465 B1 * 7/2011 Lo ............................ G02B 3/14 359/666
8,699,141 B2 4/2014 Aschwanden et al.
8,922,902 B2 12/2014 Blum et al.
9,356,500 B2 5/2016 Furlan et al.
(Continued)

FOREIGN PATENT DOCUMENTS

JP 2004343895 A 12/2004
WO 2022220971 A1 10/2022

*Primary Examiner* — Dung T Nguyen
(74) *Attorney, Agent, or Firm* — Treyz Law Group, P.C.; Joseph F. Guihan; Jinie M. Guihan

(57) ABSTRACT

An electronic device may include a lens module with a tunable lens. The tunable lens may include multiple adjustable fluid-filled bladders distributed around the periphery of the tunable lens. Fluid may be selectively added to and removed from each adjustable fluid-filled bladder to control a displacement of a lens element at a given position along the periphery. The fluid may be added to and removed from the adjustable fluid-filled bladders by fluid-controlling components. The fluid-controlling components may be positioned locally within a ring-shaped chassis portion and adjacent to a respective bladder or may be consolidated in an additional chassis portion and connected to the bladders using fluid channels through the ring-shaped chassis portion. The fluid-controlling components may include stepper motors with two subassemblies that each have a ring-shaped magnet between two coils.

21 Claims, 27 Drawing Sheets

(56) References Cited

U.S. PATENT DOCUMENTS

| | | | |
|---|---|---|---|
| 9,442,285 | B2 | 9/2016 | Rogers |
| 9,709,824 | B2 | 7/2017 | Stevens et al. |
| 9,810,923 | B2 | 11/2017 | Stevens et al. |
| 9,961,253 | B2 | 5/2018 | Bryll et al. |
| 10,151,962 | B2 | 12/2018 | Gladnick et al. |
| 10,299,434 | B2 | 5/2019 | Yanke et al. |
| 10,928,558 | B1 | 2/2021 | Cooke et al. |
| 11,079,518 | B1 | 8/2021 | Smyth et al. |
| 11,448,900 | B2 | 9/2022 | Aschwanden et al. |
| 11,762,131 | B2 | 9/2023 | Mastrangelo et al. |
| 2003/0102726 | A1 | 6/2003 | Lee |
| 2005/0012419 | A1 | 1/2005 | Kometani et al. |
| 2012/0019773 | A1 | 1/2012 | Blum et al. |
| 2015/0378067 | A1 | 12/2015 | Stevens et al. |
| 2018/0100953 | A1 | 4/2018 | Aschwanden et al. |
| 2020/0096770 | A1 | 3/2020 | Pedder et al. |
| 2020/0341172 | A1 | 10/2020 | Stevens et al. |
| 2021/0026045 | A1 | 1/2021 | Jacoby et al. |
| 2024/0385448 | A1* | 11/2024 | Pedder ............... G02B 27/0176 |

* cited by examiner

FLUID-FILLED TUNABLE LENS

This application claims the benefit of U.S. provisional patent application No. 63/514,936, filed Jul. 21, 2023, U.S. provisional patent application No. 63/514,961, filed Jul. 21, 2023, and U.S. provisional patent application No. 63/612,483, filed Dec. 20, 2023, which are hereby incorporated by reference herein in their entireties.

BACKGROUND

This relates generally to electronic devices and, more particularly, to wearable electronic device systems.

Electronic devices are sometimes configured to be worn by users. For example, head-mounted devices are provided with head-mounted structures that allow the devices to be worn on users' heads. The head-mounted devices may include optical systems with lenses.

Head-mounted devices typically include lenses with fixed shapes and properties. If care is not taken, it may be difficult to adjust these types of lenses to optimally present content to each user of the head-mounted device.

SUMMARY

A tunable lens having a periphery may include a first lens element, a second lens element, a fluid-filled chamber that is interposed between the first and second lens elements, and a plurality of adjustable fluid-filled bladders that are distributed around the periphery. Each adjustable fluid-filled bladder may be configured to selectively adjust a displacement of the first lens element relative to the second lens element at a respective position along the periphery.

A tunable lens having a periphery may include a lens element that forms part of a fluid-filled chamber, a chassis that extends in a ring around the periphery, and actuators positioned along the periphery between the chassis and the lens element. Each actuator may be configured to adjust a displacement between the chassis and the lens element at a respective position along the periphery. The tunable lens may also include a fluid-controlling component that is configured to adjust an amount of fluid in the fluid-filled chamber to cause a displacement between the chassis and the lens element to remain fixed at the multiple positions along the periphery while a shape of the lens element is changed by the actuators.

A tunable lens having a periphery may include a first lens element, a second lens element, fluid interposed between the first and second lens elements, a chassis that extends in a ring around the periphery, and actuators positioned along the periphery between the chassis and the lens element. Each actuator may be configured to adjust a displacement between the chassis and the first lens element at a respective position along the periphery. The tunable lens may also include a positioner that is configured to adjust a position of the second lens element to cause the displacement between the chassis and the first lens element to remain fixed at the multiple positions along the periphery while a shape of the first lens element is changed by the actuators.

A stepper motor may include a rotor and first and second subassemblies configured to rotate the rotor. Each one of the first and second subassemblies may include a ring-shaped magnet with a plurality of sections having alternating polarity, a first coil, and a second coil. The ring-shaped magnet may be interposed between the first and second coils.

A tunable lens having a periphery may include a lens element, a ring-shaped chassis that extends around the periphery, bladders positioned along the periphery between the ring-shaped chassis and the lens element, each bladder being configured to adjust a displacement between the ring-shaped chassis and the lens element at a respective position along the periphery, and actuators positioned on the ring-shaped chassis. Each actuator may be adjacent to a respective bladder of the bladders and may be configured to adjust an amount of fluid in its respective bladder.

A tunable lens may include a lens element that forms part of a fluid-filled chamber, one or more actuators configured to change a shape of the lens element, and a fluid-controlling component that is configured to adjust an amount of fluid in the fluid-filled chamber. The fluid-controlling component may include a flexible bladder with ribs that is aligned with an inlet for the fluid-filled chamber and that has a volume that is configured to contain fluid and a scissor jack portion that is attached to the flexible bladder. The scissor jack portion may be configured to extend in a given direction to shrink the volume of the flexible bladder and push the fluid from the flexible bladder into the fluid-filled chamber.

A tunable lens having a periphery may include a lens element, a chassis having a ring-shaped portion that comprises fluid channels and that extends around the periphery and an additional portion, bladders positioned along the periphery between the ring-shaped portion of the chassis and the lens element, each bladder being configured to adjust a displacement between the ring-shaped portion of the chassis and the lens element at a respective position along the periphery, and fluid-controlling components at the additional portion of the chassis. Each fluid channel of the fluid channels may be interposed between a respective bladder of the bladders and a respective fluid-controlling component of the fluid-controlling components.

A tunable lens having a periphery may include a first lens element, a second lens element, a fluid-filled chamber that is interposed between the first and second lens elements, and a single fluid-filled bladder that extends around the entire periphery. The single fluid-filled bladder may be configured to selectively adjust a displacement of the first lens element relative to the second lens element.

A tunable lens having a periphery may include a first lens element, a second lens element, a fluid-filled chamber that is interposed between the first and second lens elements, and a fluid-filled bladder that extends along the periphery. The fluid-filled bladder may have a height that, at uniform fluid pressure, varies along a length of the fluid-filled bladder.

A tunable lens having a periphery may include a first lens element, a second lens element, a fluid-filled chamber that is interposed between the first and second lens elements, a chassis that extends in a ring around the periphery, a rigid frame attached to the chassis, and a fluid-filled bladder that is interposed between the chassis and at least a portion of the rigid frame.

DETAILED DESCRIPTION

Figure 1:
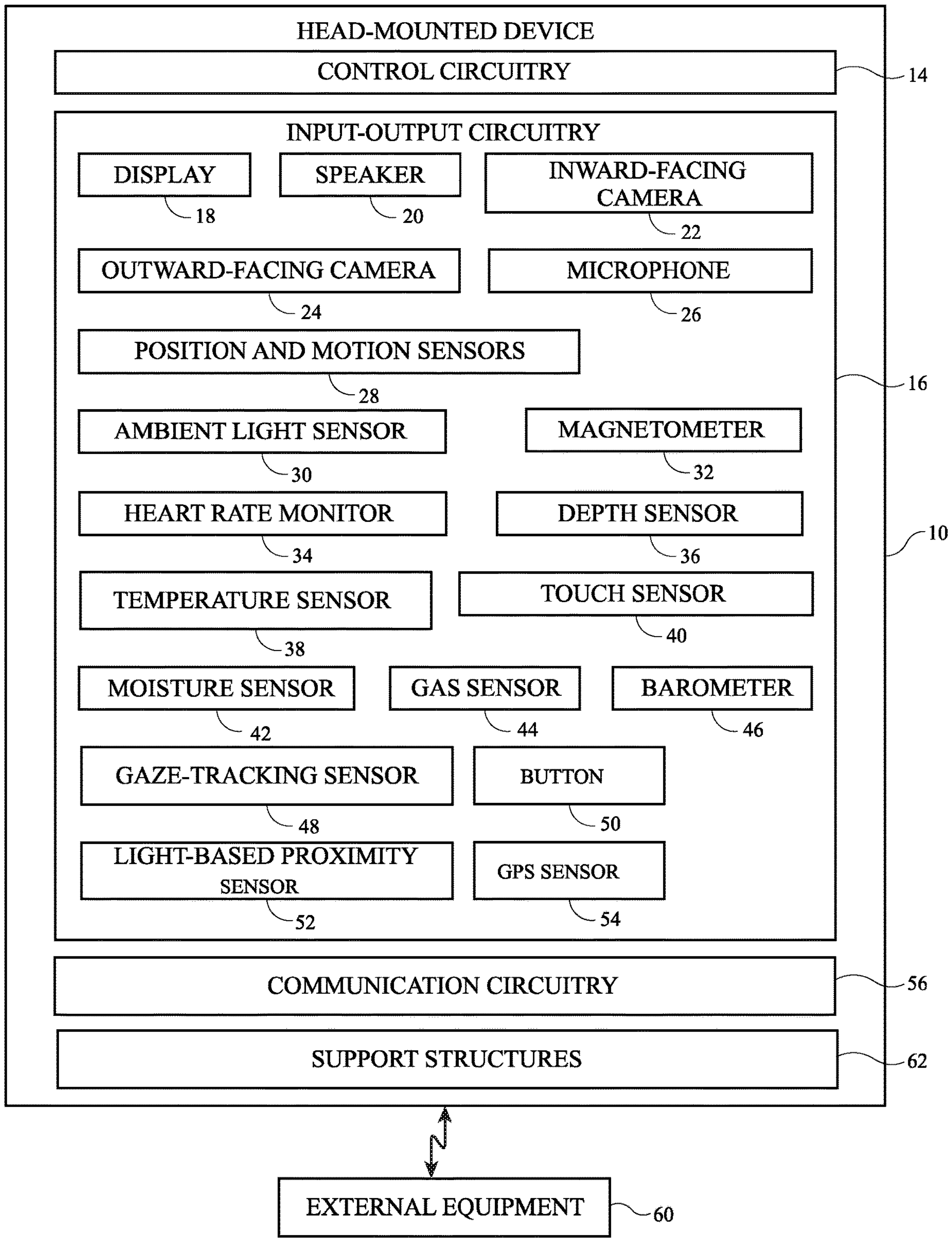
FIG. 1 is a schematic diagram of an illustrative electronic device in accordance with some embodiments.

A schematic diagram of an illustrative electronic device is shown in FIG. 1. As shown in FIG. 1, electronic device 10 (sometimes referred to as head-mounted device 10, system 10, head-mounted display 10, etc.) may have control circuitry 14. In addition to being a head-mounted device, electronic device 10 may be other types of electronic devices such as a cellular telephone, laptop computer, speaker, computer monitor, electronic watch, tablet computer, etc. Control circuitry 14 may be configured to perform operations in head-mounted device 10 using hardware (e.g., dedicated hardware or circuitry), firmware and/or software. Software code for performing operations in head-mounted device 10 and other data is stored on non-transitory computer readable storage media (e.g., tangible computer readable storage media) in control circuitry 14. The software code may sometimes be referred to as software, data, program instructions, instructions, or code. The non-transitory computer readable storage media (sometimes referred to generally as memory) may include non-volatile memory such as non-volatile random-access memory (NVRAM), one or more hard drives (e.g., magnetic drives or solid-state drives), one or more removable flash drives or other removable media, or the like. Software stored on the non-transitory computer readable storage media may be executed on the processing circuitry of control circuitry 14. The processing circuitry may include application-specific integrated circuits with processing circuitry, one or more microprocessors, digital signal processors, graphics processing units, a central processing unit (CPU) or other processing circuitry.

Head-mounted device 10 may include input-output circuitry 16. Input-output circuitry 16 may be used to allow a user to provide head-mounted device 10 with user input. Input-output circuitry 16 may also be used to gather information on the environment in which head-mounted device 10 is operating. Output components in circuitry 16 may allow head-mounted device 10 to provide a user with output.

As shown in FIG. 1, input-output circuitry 16 may include a display such as display 18. Display 18 may be used to display images for a user of head-mounted device 10. Display 18 may be a transparent or translucent display so that a user may observe physical objects through the display while computer-generated content is overlaid on top of the physical objects by presenting computer-generated images on the display. A transparent or translucent display may be formed from a transparent or translucent pixel array (e.g., a transparent organic light-emitting diode display panel) or may be formed by a display device that provides images to a user through a transparent structure such as a beam splitter, holographic coupler, or other optical coupler (e.g., a display device such as a liquid crystal on silicon display). Alternatively, display 18 may be an opaque display that blocks light from physical objects when a user operates head-mounted device 10. In this type of arrangement, a pass-through camera may be used to display physical objects to the user. The pass-through camera may capture images of the physical environment and the physical environment images may be displayed on the display for viewing by the user. Additional computer-generated content (e.g., text, game-content, other visual content, etc.) may optionally be overlaid over the physical environment images to provide an extended reality environment for the user. When display 18 is opaque, the display may also optionally display entirely computer-generated content (e.g., without displaying images of the physical environment).

Display 18 may include one or more optical systems (e.g., lenses) (sometimes referred to as optical assemblies) that allow a viewer to view images on display(s) 18. A single display 18 may produce images for both eyes or a pair of displays 18 may be used to display images. In configurations with multiple displays (e.g., left and right eye displays), the focal length and positions of the lenses may be selected so that any gap present between the displays will not be visible to a user (e.g., so that the images of the left and right displays overlap or merge seamlessly). Display modules (sometimes referred to as display assemblies) that generate different images for the left and right eyes of the user may be referred to as stereoscopic displays. The stereoscopic displays may be capable of presenting two-dimensional content (e.g., a user notification with text) and three-dimensional content (e.g., a simulation of a physical object such as a cube).

The example of device 10 including a display is merely illustrative and display(s) 18 may be omitted from device 10 if desired. Device 10 may include an optical pass-through area where real-world content is viewable to the user either directly or through a tunable lens.

Input-output circuitry 16 may include various other input-output devices. For example, input-output circuitry 16 may include one or more speakers 20 that are configured to play audio and one or more microphones 26 that are configured to capture audio data from the user and/or from the physical environment around the user.

Input-output circuitry 16 may also include one or more cameras such as an inward-facing camera 22 (e.g., that face the user's face when the head-mounted device is mounted on the user's head) and an outward-facing camera 24 (that face the physical environment around the user when the head-mounted device is mounted on the user's head). Cameras 22 and 24 may capture visible light images, infrared images, or images of any other desired type. The cameras may be stereo cameras if desired. Inward-facing camera 22 may capture images that are used for gaze-detection operations, in one possible arrangement. Outward-facing camera 24 may capture pass-through video for head-mounted device 10.

As shown in FIG. 1, input-output circuitry 16 may include position and motion sensors 28 (e.g., compasses, gyroscopes, accelerometers, and/or other devices for monitoring the location, orientation, and movement of head-mounted device 10, satellite navigation system circuitry such as Global Positioning System circuitry for monitoring user location, etc.). Using sensors 28, for example, control circuitry 14 can monitor the current direction in which a user's head is oriented relative to the surrounding environment (e.g., a user's head pose). One or more of cameras 22 and 24 may also be considered part of position and motion sensors 28. The cameras may be used for face tracking (e.g., by capturing images of the user's jaw, mouth, etc. while the device is worn on the head of the user), body tracking (e.g., by capturing images of the user's torso, arms, hands, legs, etc. while the device is worn on the head of user), and/or for localization (e.g., using visual odometry, visual inertial odometry, or other simultaneous localization and mapping (SLAM) technique).

Input-output circuitry 16 may also include other sensors and input-output components if desired. As shown in FIG. 1, input-output circuitry 16 may include an ambient light sensor 30. The ambient light sensor may be used to measure ambient light levels around head-mounted device 10. The ambient light sensor may measure light at one or more wavelengths (e.g., different colors of visible light and/or infrared light).

Input-output circuitry 16 may include a magnetometer 32. The magnetometer may be used to measure the strength and/or direction of magnetic fields around head-mounted device 10.

Input-output circuitry 16 may include a heart rate monitor 34. The heart rate monitor may be used to measure the heart rate of a user wearing head-mounted device 10 using any desired techniques.

Input-output circuitry 16 may include a depth sensor 36. The depth sensor may be a pixelated depth sensor (e.g., that is configured to measure multiple depths across the physical environment) or a point sensor (that is configured to measure a single depth in the physical environment). The depth sensor (whether a pixelated depth sensor or a point sensor) may use phase detection (e.g., phase detection autofocus pixel(s)) or light detection and ranging (LIDAR) to measure depth. Any combination of depth sensors may be used to determine the depth of physical objects in the physical environment.

Input-output circuitry 16 may include a temperature sensor 38. The temperature sensor may be used to measure the temperature of a user of head-mounted device 10, the temperature of head-mounted device 10 itself, or an ambient temperature of the physical environment around head-mounted device 10.

Input-output circuitry 16 may include a touch sensor 40. The touch sensor may be, for example, a capacitive touch sensor that is configured to detect touch from a user of the head-mounted device.

Input-output circuitry 16 may include a moisture sensor 42. The moisture sensor may be used to detect the presence of moisture (e.g., water) on, in, or around the head-mounted device.

Input-output circuitry 16 may include a gas sensor 44. The gas sensor may be used to detect the presence of one or more gases (e.g., smoke, carbon monoxide, etc.) in or around the head-mounted device.

Input-output circuitry 16 may include a barometer 46. The barometer may be used to measure atmospheric pressure, which may be used to determine the elevation above sea level of the head-mounted device.

Input-output circuitry 16 may include a gaze-tracking sensor 48 (sometimes referred to as gaze-tracker 48 and gaze-tracking system 48). The gaze-tracking sensor 48 may include a camera and/or other gaze-tracking sensor components (e.g., light sources that emit beams of light so that reflections of the beams from a user's eyes may be detected) to monitor the user's eyes. Gaze-tracker 48 may face a user's eyes and may track a user's gaze. A camera in the gaze-tracking system may determine the location of a user's eyes (e.g., the centers of the user's pupils), may determine the direction in which the user's eyes are oriented (the direction of the user's gaze), may determine the user's pupil size (e.g., so that light modulation and/or other optical parameters and/or the amount of gradualness with which one or more of these parameters is spatially adjusted and/or the area in which one or more of these optical parameters is adjusted based on the pupil size), may be used in monitoring the current focus of the lenses in the user's eyes (e.g., whether the user is focusing in the near field or far field, which may be used to assess whether a user is day dreaming or is thinking strategically or tactically), and/or other gaze information. Cameras in the gaze-tracking system may sometimes be referred to as inward-facing cameras, gaze-detection cameras, eye-tracking cameras, gaze-tracking cameras, or eye-monitoring cameras. If desired, other types of image sensors (e.g., infrared and/or visible light-emitting diodes and light detectors, etc.) may also be used in monitoring a user's gaze. The use of a gaze-detection camera in gaze-tracker 48 is merely illustrative.

Input-output circuitry 16 may include a button 50. The button may include a mechanical switch that detects a user press during operation of the head-mounted device.

Input-output circuitry 16 may include a light-based proximity sensor 52. The light-based proximity sensor may include a light source (e.g., an infrared light source) and an image sensor (e.g., an infrared image sensor) configured to detect reflections of the emitted light to determine proximity to nearby objects.

Input-output circuitry 16 may include a global positioning system (GPS) sensor 54. The GPS sensor may determine location information for the head-mounted device. The GPS sensor may include one or more antennas used to receive GPS signals. The GPS sensor may be considered a part of position and motion sensors 28.

Input-output circuitry 16 may include any other desired components (e.g., capacitive proximity sensors, other proximity sensors, strain gauges, pressure sensors, audio components, haptic output devices such as vibration motors, light-emitting diodes, other light sources, etc.).

Head-mounted device 10 may also include communication circuitry 56 to allow the head-mounted device to communicate with external equipment (e.g., a tethered computer, a portable device such as a handheld device or laptop computer, one or more external servers, or other electrical equipment). Communication circuitry 56 may be used for both wired and wireless communication with external equipment.

Communication circuitry 56 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

The radio-frequency transceiver circuitry in wireless communications circuitry 56 may handle wireless local area network (WLAN) communications bands such as the 2.4 GHz and 5 GHz Wi-Fi® (IEEE 802.11) bands, wireless personal area network (WPAN) communications bands such as the 2.4 GHz Bluetooth® communications band, cellular telephone communications bands such as a cellular low band (LB) (e.g., 600 to 960 MHz), a cellular low-midband (LMB) (e.g., 1400 to 1550 MHz), a cellular midband (MB) (e.g., from 1700 to 2200 MHz), a cellular high band (HB) (e.g., from 2300 to 2700 MHz), a cellular ultra-high band (UHB) (e.g., from 3300 to 5000 MHz, or other cellular communications bands between about 600 MHz and about 5000 MHz (e.g., 3G bands, 4G LTE bands, 5G New Radio Frequency Range 1 (FR1) bands below 10 GHz, etc.), a near-field communications (NFC) band (e.g., at 13.56 MHz), satellite navigations bands (e.g., an L1 global positioning system (GPS) band at 1575 MHz, an L5 GPS band at 1176 MHz, a Global Navigation Satellite System (GLONASS) band, a BeiDou Navigation Satellite System (BDS) band, etc.), ultra-wideband (UWB) communications band(s) supported by the IEEE 802.15.4 protocol and/or other UWB communications protocols (e.g., a first UWB communications band at 6.5 GHz and/or a second UWB communications band at 8.0 GHz), and/or any other desired communications bands.

The radio-frequency transceiver circuitry may include millimeter/centimeter wave transceiver circuitry that supports communications at frequencies between about 10 GHz and 300 GHz. For example, the millimeter/centimeter wave transceiver circuitry may support communications in Extremely High Frequency (EHF) or millimeter wave communications bands between about 30 GHz and 300 GHz and/or in centimeter wave communications bands between about 10 GHz and 30 GHz (sometimes referred to as Super High Frequency (SHF) bands). As examples, the millimeter/centimeter wave transceiver circuitry may support communications in an IEEE K communications band between about 18 GHz and 27 GHz, a $K_a$ communications band between about 26.5 GHz and 40 GHz, a $K_u$ communications band between about 12 GHz and 18 GHz, a V communications band between about 40 GHz and 75 GHz, a W communications band between about 75 GHz and 110 GHz, or any other desired frequency band between approximately 10 GHz and 300 GHz. If desired, the millimeter/centimeter wave transceiver circuitry may support IEEE 802.11ad communications at 60 GHz (e.g., WiGig or 60 GHz Wi-Fi bands around 57-61 GHz), and/or $5^{th}$ generation mobile networks or $5^{th}$ generation wireless systems (5G) New Radio (NR) Frequency Range 2 (FR2) communications bands between about 24 GHz and 90 GHz.

Antennas in wireless communications circuitry 56 may include antennas with resonating elements that are formed from loop antenna structures, patch antenna structures, inverted-F antenna structures, slot antenna structures, planar inverted-F antenna structures, helical antenna structures, dipole antenna structures, monopole antenna structures, hybrids of these designs, etc. Different types of antennas may be used for different bands and combinations of bands. For example, one type of antenna may be used in forming a local wireless link and another type of antenna may be used in forming a remote wireless link antenna.

During operation, head-mounted device 10 may use communication circuitry 56 to communicate with external equipment 60. External equipment 60 may include one or more external servers, an electronic device that is paired with head-mounted device 10 (such as a cellular telephone, a laptop computer, a speaker, a computer monitor, an electronic watch, a tablet computer, earbuds, etc.), a vehicle, an internet of things (IoT) device (e.g., remote control, light switch, doorbell, lock, smoke alarm, light, thermostat, oven, refrigerator, stove, grill, coffee maker, toaster, microwave, etc.), etc.

Electronic device 10 may have housing structures (e.g., housing walls, straps, etc.), as shown by illustrative support structures 62 of FIG. 1. In configurations in which electronic device 10 is a head-mounted device (e.g., a pair of glasses, goggles, a helmet, a hat, etc.), support structures 62 may include head-mounted support structures (e.g., a helmet housing, head straps, temples in a pair of eyeglasses, goggle housing structures, and/or other head-mounted structures). The head-mounted support structures may be configured to be worn on a head of a user during operation of device 10 and may support control circuitry 14, input-output circuitry 16, and/or communication circuitry 56.

Figure 2:
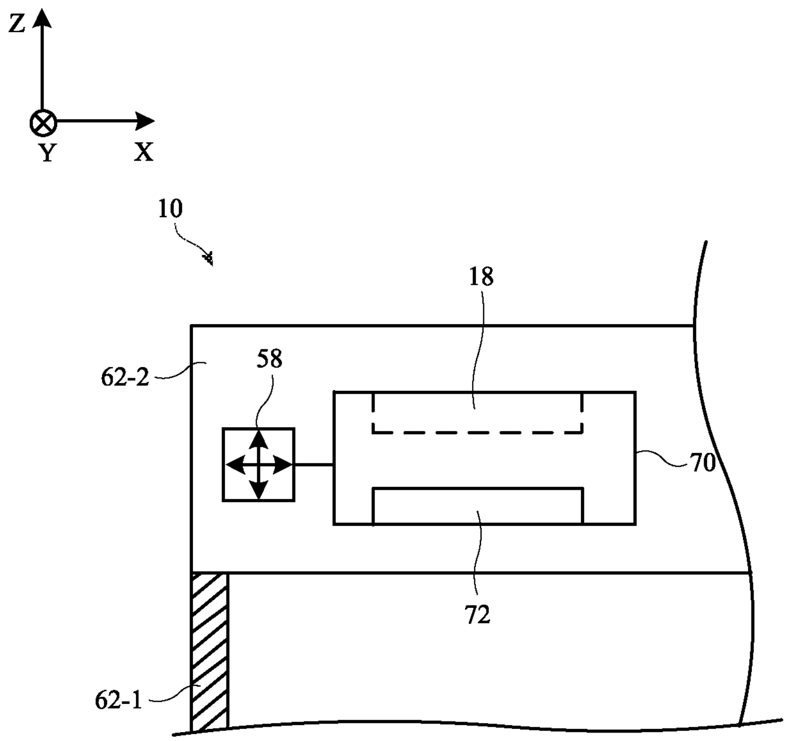
FIG. 2 is a top view of an illustrative head-mounted device with a lens module in accordance with some embodiments.

FIG. 2 is a top view of electronic device 10 in an illustrative configuration in which electronic device 10 is a head-mounted device. As shown in FIG. 2, electronic device 10 may include support structures (see, e.g., support structures 62 of FIG. 1) that are used in housing the components of device 10 and mounting device 10 onto a user's head. These support structures may include, for example, structures that form housing walls and other structures for main unit 62-2 (e.g., exterior housing walls, lens module structures, etc.) and eyeglass temples or other supplemental support structures such as structures 62-1 that help to hold main unit 62-2 on a user's face.

The electronic device may include optical modules such as optical module 70. The electronic device may include left and right optical modules that correspond respectively to a user's left eye and right eye. An optical module corresponding to the user's left eye is shown in FIG. 2.

Each optical module 70 includes a corresponding lens module 72 (sometimes referred to as lens stack-up 72, lens 72, or adjustable lens 72). Lens 72 may include one or more lens elements arranged along a common axis. Each lens element may have any desired shape and may be formed from any desired material (e.g., with any desired refractive index). The lens elements may have unique shapes and refractive indices that, in combination, focus light (e.g., from a display or from the physical environment) in a desired manner. Each lens element of lens module 72 may be formed from any desired material (e.g., glass, a polymer material such as polycarbonate or acrylic, a crystal such as sapphire, etc.).

Modules 70 may optionally be individually positioned relative to the user's eyes and relative to some of the housing wall structures of main unit 26-2 using positioning circuitry such as positioner 58. Positioner 58 may include stepper motors, piezoelectric actuators, motors, linear electromagnetic actuators, shape memory alloys (SMAs), and/or other electronic components for adjusting the position of displays, the optical modules 70, and/or lens modules 72. Positioners 58 may be controlled by control circuitry 14 during operation of device 10. For example, positioners 58 may be used to adjust the spacing between modules 70 (and therefore the lens-to-lens spacing between the left and right lenses of modules 70) to match the interpupillary distance IPD of a user's eyes. In another example, the lens module may include an adjustable lens element. The curvature of the adjustable lens element may be adjusted in real time by positioner(s) 58 to compensate for a user's eyesight and/or viewing conditions.

Each optical module may optionally include a display such as display 18 in FIG. 2. As previously mentioned, the displays may be omitted from device 10 if desired. In this type of arrangement, the device may still include one or more lens modules 72 (e.g., through which the user views the real world). In this type of arrangement, real-world content may be selectively focused for a user.

Figure 3:
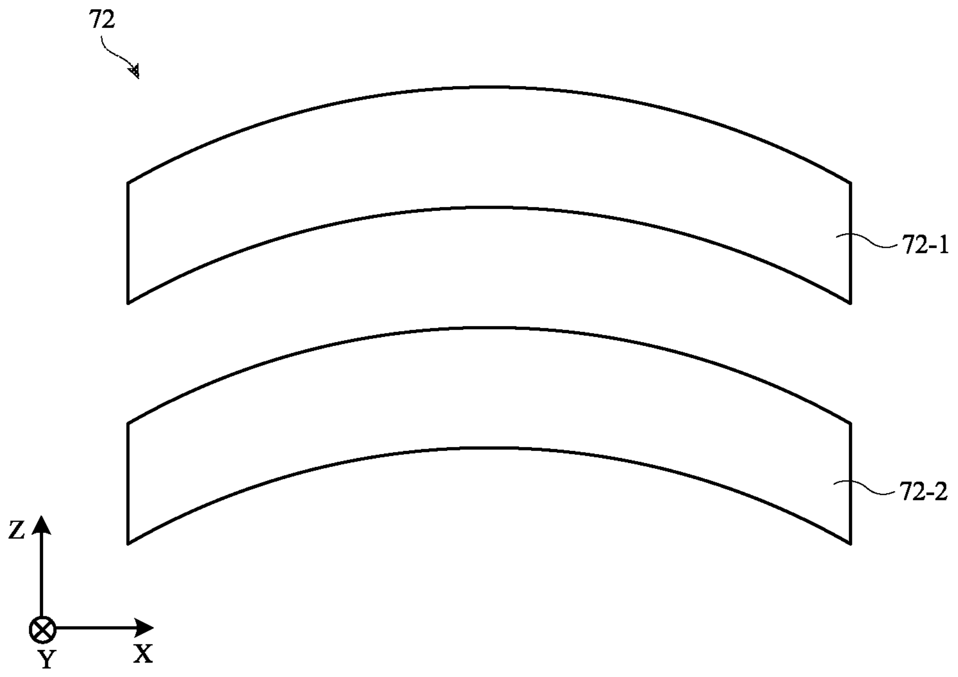
FIG. 3 is a side view of an illustrative lens module in accordance with some embodiments.

FIG. 3 is a cross-sectional side view of an illustrative lens module with multiple lens elements. As shown, lens module 72 includes a first lens element 72-1 and a second lens element 72-2. Each surface of the lens elements may have any desired curvature. For example, each surface may be a convex surface (e.g., a spherically convex surface, a cylindrically convex surface, or an aspherically convex surface), a concave surface (e.g., a spherically concave surface, a cylindrically concave surface, or an aspherically concave surface), a combination of convex and concave surfaces, or a freeform surface. A spherically curved surface (e.g., a spherically convex or spherically concave surface) may have a constant radius of curvature across the surface. In contrast, an aspherically curved surface (e.g., an aspheric concave surface or an aspheric convex surface) may have a varying radius of curvature across the surface. A cylindrical surface may only be curved about one axis instead of about multiple axes as with the spherical surface. In some cases, one of the lens surfaces may have an aspheric surface that changes from being convex (e.g., at the center) to concave (e.g., at the edges) at different positions on the surface. This type of surface may be referred to as an aspheric surface, a primarily convex (e.g., the majority of the surface is convex and/or the surface is convex at its center) aspheric surface, a freeform surface, and/or a primarily convex (e.g., the majority of the surface is convex and/or the surface is convex at its center) freeform surface. A freeform surface may include both convex and concave portions and/or curvatures defined by polynomial series and expansions. Alternatively, a freeform surface may have varying convex curvatures or varying concave curvatures (e.g., different portions with different radii of curvature, portions with curvature in one direction and different portions with curvature in two directions, etc.). Herein, a freeform surface that is primarily convex (e.g., the majority of the surface is convex and/or the surface is convex at its center) may sometimes still be referred to as a convex surface and a freeform surface that is primarily concave (e.g., the majority of the surface is concave and/or the surface is concave at its center) may sometimes still be referred to as a concave surface. In one example, shown in FIG. 3, lens element 72-1 has a convex surface that faces display 18 and an opposing concave surface. Lens element 72-2 has a convex surface that faces lens element 72-1 and an opposing concave surface.

One or both of lens elements 72-1 and 72-2 may be adjustable. In one example, lens element 72-1 is a non-adjustable lens element whereas lens element 72-2 is an adjustable lens element. The adjustable lens element 72-2 may be used to accommodate a user's eyeglass prescription, for example. The shape of lens element 72-2 may be adjusted if a user's eyeglass prescription changes (without needing to replace any of the other components within device 10). As another possible use case, a first user with a first eyeglass prescription (or no eyeglass prescription) may use device 10 with lens element 72-2 having a first shape and a second, different user with a second eyeglass prescription may use device 10 with lens element 72-2 having a second shape that is different than the first shape. Lens element 72-2 may have varying lens power and/or may provide varying amounts and orientations of astigmatism correction to provide prescription correction for the user.

The example of lens module 72 including two lens elements is merely illustrative. In general, lens module 72 may include any desired number of lens elements (e.g., one, two, three, four, more than four, etc.). Any subset or all of the lens elements may optionally be adjustable. Any of the adjustable lens elements in the lens module may optionally be fluid-filled adjustable lenses. Lens module 72 may also include any desired additional optical layers (e.g., partially reflective mirrors that reflect 50% of incident light, linear polarizers, retarders such as quarter wave plates, reflective polarizers, circular polarizers, reflective circular polarizers, etc.) to manipulate light that passes through lens module.

In one possible arrangement, lens element 72-1 may be a removable lens element. In other words, a user may be able to easily remove and replace lens element 72-1 within optical module 70. This may allow lens element 72-1 to be customizable. If lens element 72-1 is permanently affixed to the lens assembly, the lens power provided by lens element 72-1 cannot be easily changed. However, by making lens element 72-1 customizable, a user may select a lens element 72-1 that best suits their eyes and place the appropriate lens element 72-1 in the lens assembly. The lens element 72-1 may be used to accommodate a user's eyeglass prescription, for example. A user may replace lens element 72-1 with an updated lens element if their eyeglass prescription changes (without needing to replace any of the other components within electronic device 10). Lens element 72-1 may have varying lens power and/or may provide varying amount of astigmatism correction to provide prescription correction for the user. Lens element 72-1 may include one or more attachment structures that are configured to attach to corresponding attachment structures included in optical module 70, lens element 72-2, support structures 26, or another structure in electronic device 10.

In contrast with lens element 72-1, lens element 72-2 may not be a removable lens element. Lens element 72-2 may therefore sometimes be referred to as a permanent lens element, non-removable lens element, etc. The example of lens element 72-2 being a non-removable lens element is merely illustrative. In another possible arrangement, lens element 72-2 may also be a removable lens element (similar to lens element 72-1).

As previously mentioned, one or more of the adjustable lens elements may be a fluid-filled lens element. An example is described herein where lens element 72-2 from FIG. 3 is a fluid-filled lens element. When lens element 72-2 is a fluid-filled lens element, the lens element may include one or more components that define the surfaces of lens element 72-2. These elements may also be referred to as lens elements. In other words, adjustable lens element 72-2 (sometimes referred to as adjustable lens module 72-2, adjustable lens 72-2, tunable lens 72-2, etc.) may be formed by multiple respective lens elements.

Figure 4:
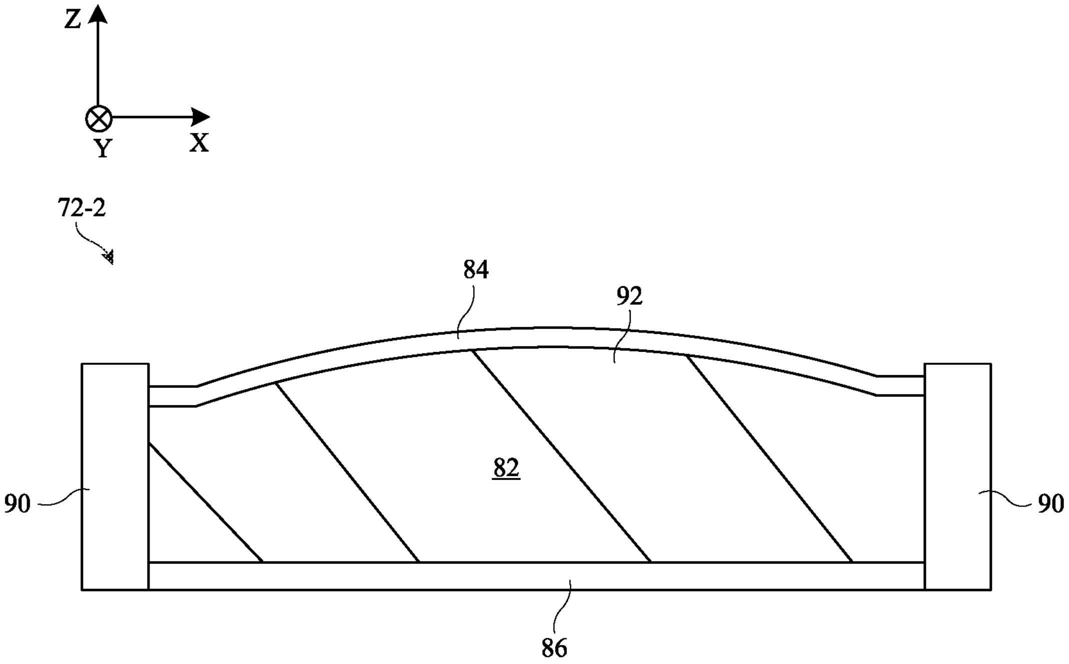
FIGS. 4 and 5 are side views of an illustrative tunable lens in different tuning states in accordance with some embodiments.

FIG. 4 is a cross-sectional side view of adjustable fluid-filled lens element 72-2. As shown, fluid-filled chamber 82 (sometimes referred to as chamber 82, fluid chamber 82, primary chamber 82, etc.) that includes fluid 92 is interposed between lens elements 84 and 86. Lens elements 84 and 86 may sometimes be referred to as part of chamber 82 or may sometimes be referred to as separate from chamber 82. Fluid 92 may be a liquid, gel, or gas with a pre-determined index of refraction (and may therefore sometimes be referred to as liquid 92, gel 92, or gas 92). The fluid may sometimes be referred to as an index-matching oil, an optical oil, an optical fluid, an index-matching material, an index-matching liquid, etc. Lens elements 84 and 86 may have the same index of refraction or may have different indices of refraction. Fluid 92 that fills chamber 82 between lens elements 84 and 86 may have an index of refraction that is the same as the index of refraction of lens element 84 but different from the index of refraction of lens element 86, may have an index of refraction that is the same as the index of refraction of lens element 86 but different from the index of refraction of lens element 84, may have an index of refraction that is the same as the index of refraction of lens element 84 and lens element 86, or may have an index of refraction that is different from the index of refraction of lens element 84 and lens element 86. Lens elements 84 and 86 may have a circular footprint, may have an elliptical footprint, may have or may have a footprint any another desired shape (e.g., an irregular footprint).

The amount of fluid 92 in chamber 82 may have a constant volume or an adjustable volume. If the amount of fluid is adjustable, the lens module may also include a fluid reservoir and a fluid controlling component (e.g., a pump, stepper motor, piezoelectric actuator, shape memory alloy (SMA), motor, linear electromagnetic actuator, and/or other electronic component that applies a force to the fluid in the fluid reservoir) for selectively transferring fluid between the fluid reservoir and the chamber.

Lens elements 84 and 86 may be transparent lens elements formed from any desired material (e.g., glass, a polymer material such as polycarbonate or acrylic, a crystal such as sapphire, etc.). Each one of lens elements 84 and 86 may be elastomeric, semi-rigid, or rigid. In one example, lens element 84 is an elastomeric lens element whereas lens element 86 is a rigid lens element.

Elastomeric lens elements (e.g., lens element 84 in FIGS. 4 and 5) may be formed from a natural or synthetic polymer that has a low Young's modulus for high flexibility. For example the elastomeric membrane may be formed from a material having a Young's modulus of less than 1 GPa, less than 0.5 GPa, less than 0.1 GPa, etc.

Semi-rigid lens elements may be formed from a semi-rigid material that is stiff and solid, but not inflexible. A semi-rigid lens element may, for example, be formed from a thin layer of polymer or glass. Semi-rigid lens elements may be formed from a material having a Young's modulus that is greater than 1 Gpa, greater than 2 GPa, greater than 3 GPa, greater than 10 GPa, greater than 25 GPa, etc. Semi-rigid lens elements may be formed from polycarbonate, polyethylene terephthalate (PET), polymethylmethacrylate (PMMA), acrylic, glass, or any other desired material. The properties of semi-rigid lens elements may result in the lens element becoming rigid along a first axis when the lens element is curved along a second axis perpendicular to the first axis or, more generally, for the product of the curvature along its two principal axes of curvature to remain roughly constant as it flexes. This is in contrast to an elastomeric lens element, which remains flexible along a first axis even when the lens element is curved along a second axis perpendicular to the first axis. The properties of semi-rigid lens elements may allow the semi-rigid lens elements to form a cylindrical lens with tunable lens power and a tunable axis.

Rigid lens elements (e.g., lens element 86 in FIGS. 4 and 5) may be formed from glass, a polymer material such as polycarbonate or acrylic, a crystal such as sapphire, etc. In general, the rigid lens elements may not deform when pressure is applied to the lens elements within the lens module. In other words, the shape and position of the rigid lens elements may be fixed. Each surface of a rigid lens element may be planar, concave (e.g., spherically, aspherically, or cylindrically concave), or convex (e.g., spherically, aspherically, or cylindrically convex). Rigid lens elements may be formed from a material having a Young's modulus that is greater than 25 GPa, greater than 30 GPa, greater than 40 GPa, greater than 50 GPa, etc.

One or more structures such as a lens housing 90 (sometimes referred to as housing 90, lens chassis 90, chassis 90, support structure 90, etc.) may also define the fluid-filled chamber 82 of lens element 72-2.

Figure 5:
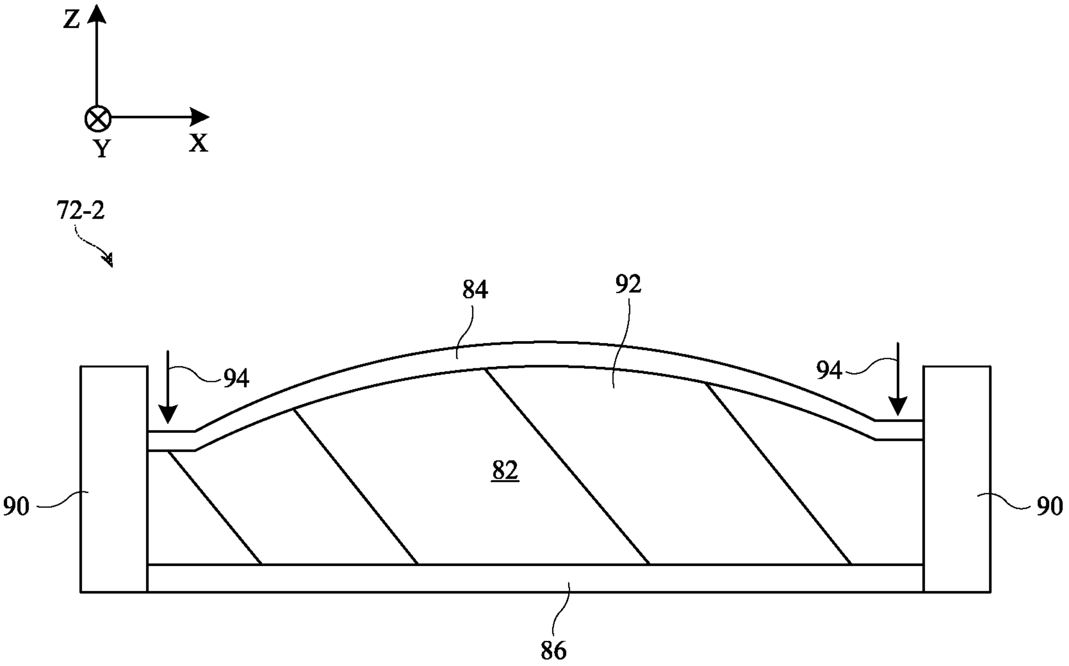

FIG. 5 is a cross-sectional side view of lens element 72-2 showing an illustrative adjustment of the shape of lens element 72-2. As shown, during adjustments of lens element 72-2, lens element 84 may be biased in direction 94 at multiple points along its periphery (e.g., a point force is applied in direction 94 at multiple points). In this way, the curvature of the lens element 84 (and accordingly, the lens power of lens element 72-2) may be adjusted.

There are multiple options for how to manipulate the shape of lens element 84. In one possible arrangement, a plurality of actuators (e.g., linear actuators) may be coupled to the periphery of the lens element. The actuators may be distributed evenly around the periphery of the lens element 84, as one example. Each actuator (e.g., a linear actuator) may be coupled to a respective portion of lens element 84 and may selectively move that respective portion of lens element 84 up and down (e.g., in the Z-direction in FIGS. 4 and 5) to control the position of that respective portion of lens element 84 in the Z-direction. A lens shaping element (e.g., a ring-shaped element) may optionally be coupled to both lens element 84 and the actuators.

The example of tunable lens element 72-2 being a fluid-filled lens element is merely illustrative. In general, tunable lens element 72-2 may be any desired type of tunable lens element with adjustable optical power.

In one illustrative arrangement, the actuators used to manipulate lens element 84 may include fluid-filled bladders that are independently filled and emptied to control a height of that bladder. Each fluid-filled bladder may be connected to lens element 84 (e.g., via a lens shaping element). The adjustment of the heights of the fluid-filled bladder therefore causes the shape of lens element 84 to change. Each fluid-filled bladder may be impermeable to fluid such as fluid 92 such that the fluid-filled bladder also defines part of the fluid-filled chamber 82 for the tunable lens.

Figure 6:
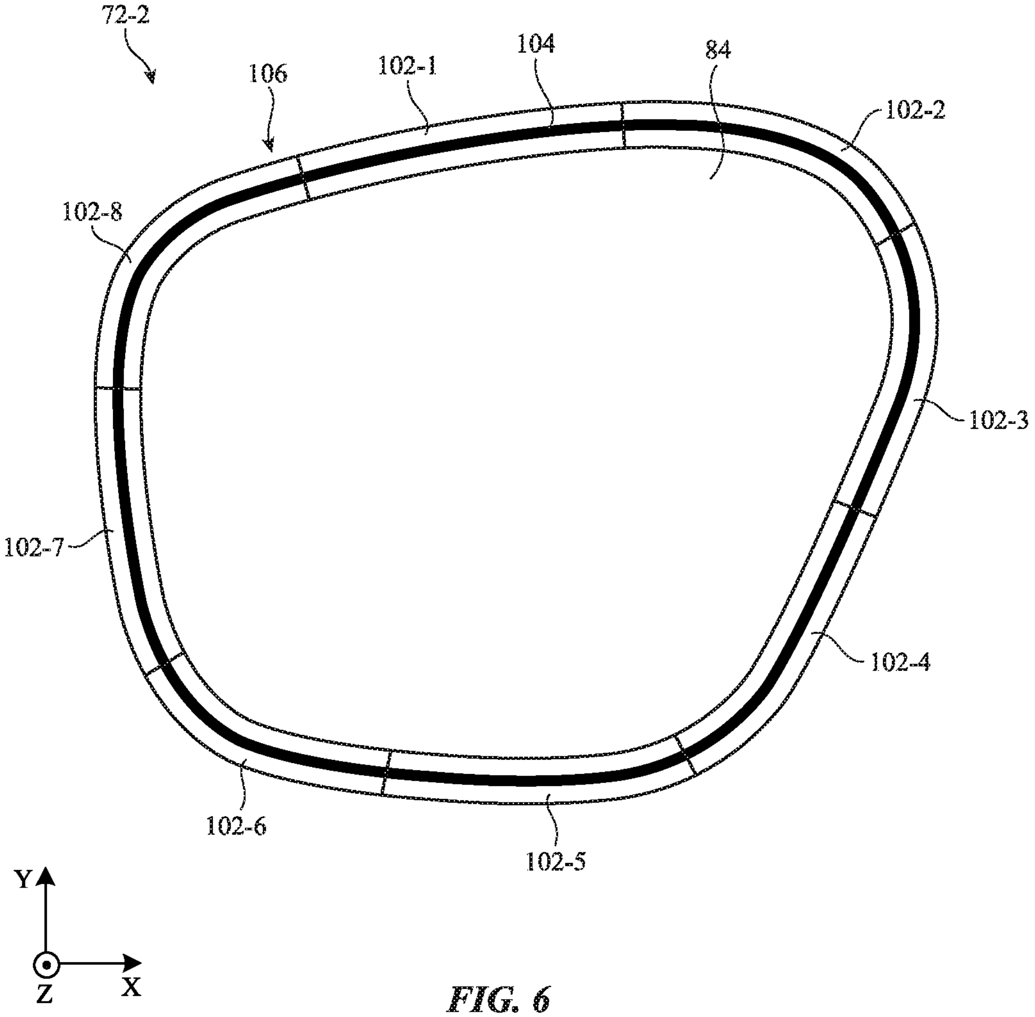
FIG. 6 is a top view of an illustrative tunable lens with a plurality of adjustable fluid-filled bladders in accordance with some embodiments.

FIG. 6 is a top view of an illustrative tunable lens 72-2 with a plurality of fluid-filled bladders 102 (sometimes referred to as actuators 102, hydraulic actuators 102, bladders 102, etc.). In the example of FIG. 6, there are eight fluid-filled bladders distributed around the periphery of tunable lens 72-2: fluid-filled bladder 102-1, fluid-filled bladder 102-2, fluid-filled bladder 102-3, fluid-filled bladder 102-4, fluid-filled bladder 102-5, fluid-filled bladder 102-6, fluid-filled bladder 102-7, and fluid-filled bladder 102-8.

A lens shaping element 104 may also be formed around the periphery of tunable lens 72-2. The lens shaping element may be attached between lens element 84 and bladders 102. Lens shaping element 104 (sometimes referred to as lens shaper 104, deformable lens shaper 104, lens shaping structure 104, lens shaping member 104, annular member 104, ring-shaped structure 104, etc.) is manipulated by the fluid-filled bladders 102 and in turn manipulates the positioning/shape of lens element 84. In this way, the curvature of the lens element 84 (and accordingly, the lens power of lens module 72) may be adjusted.

Because lens shaping element 104 is formed in a ring around the periphery of the lens module, lens shaping element 104 does not need to be transparent (and therefore may be formed from an opaque material such as metal).

As shown by the top view of FIG. 6, the lens shaping element 88 may have an annular or ring shape with the lens shaping element surrounding a central opening. Similarly, fluid-filled bladders 102 may have an annular or ring shape with the lens shaping element surrounding a central opening. In general, the footprint of the lens shaping element and the fluid-filled bladders 102 may have any desired shape (e.g., circular, elliptical, or irregular). In the example of FIG. 6, the footprint of the lens shaping element and the fluid-filled bladders 102 have an irregular shape (e.g., a non-uniform radius around the ring shape). Lens 72-2 may sometimes be referred to as non-circular shaped, non-elliptical shaped, irregular shaped, etc.

The fluid-filled bladders 102 may optionally define a sidewall for fluid-filled chamber 82 of tunable lens 72-2. In other words, fluid 92 in fluid-filled chamber 82 may directly contact the fluid-filled chambers 102 in addition to lens elements 84 and 86. The fluid-filled bladders may sometimes collectively be referred to as a bellows structure 106 that extends in a ring around the periphery of tunable lens 72-2. The bellows structure 106 is sufficiently compliant to permit adjustment to the shape of lens shaper 104 and lens element 84. However, the bellows structure maintains a stable boundary for the fluid 92 inside fluid-filled chamber 82.

Figure 7A:
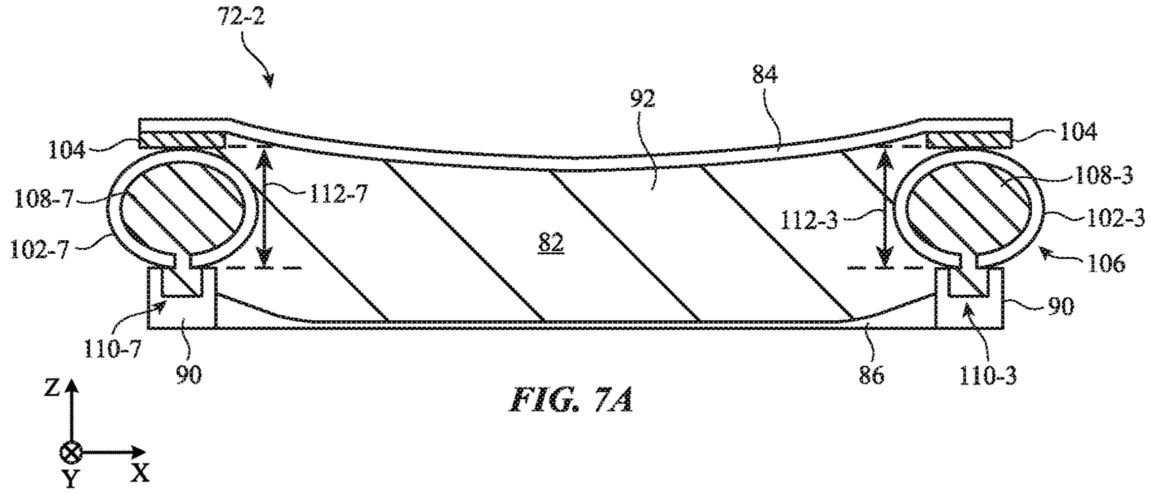
FIGS. 7A, 7B, and 7C are cross-sectional side views of an illustrative tunable lens with adjustable fluid-filled bladders that define a boundary for a fluid-filled chamber in accordance with some embodiments.
Figure 7B:
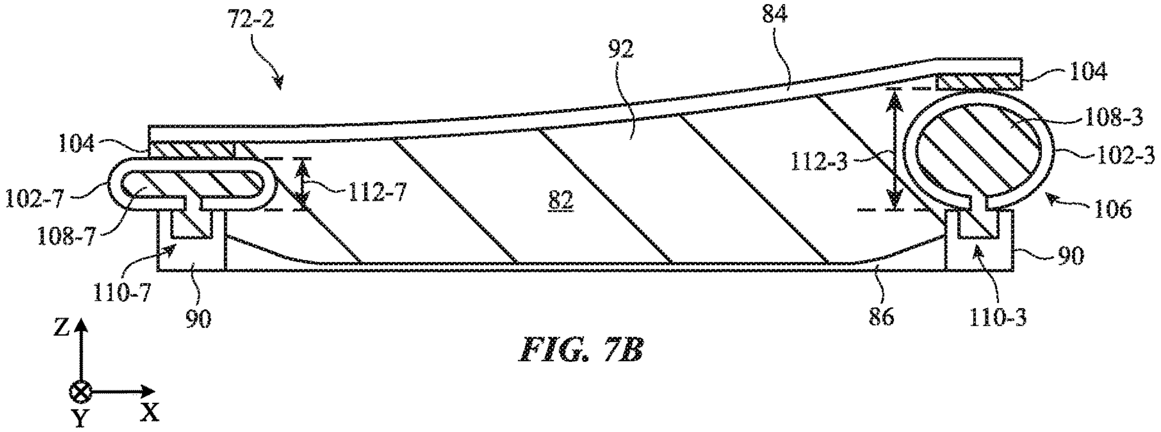
Figure 7C:
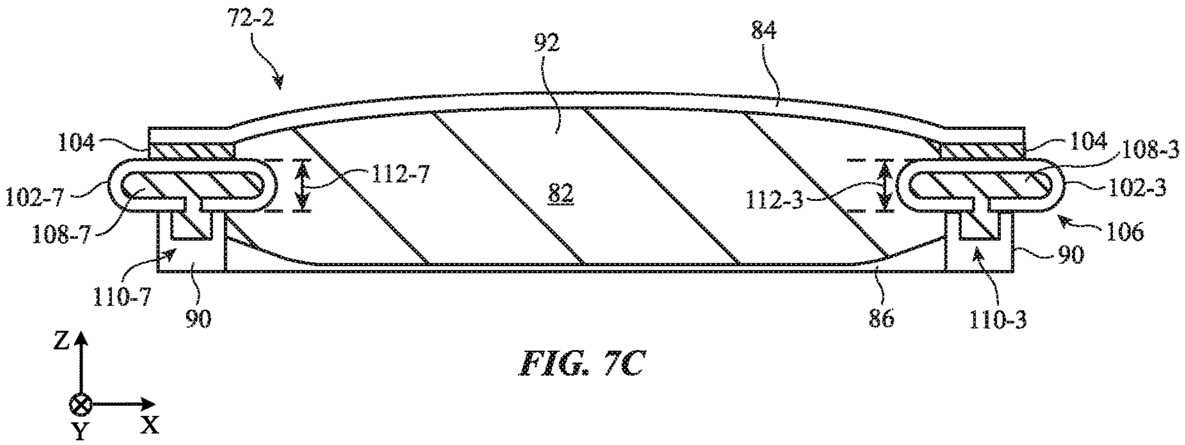

FIGS. 7A, 7B, and 7C are cross-sectional side views of an illustrative tunable lens with fluid-filled bladders that define a boundary for a fluid-filled chamber. FIGS. 7A-7C show fluid-filled bladders 102-3 and 102-7. Each fluid-filled bladder includes a compliant material that defines a chamber for a respective fluid 108. In other words, fluid-filled bladder 102-1 is filled with fluid 108-1 that is pumped in and out of the fluid-filled bladder from reservoir 110-1, fluid-filled bladder 102-2 is filled with fluid 108-2 that is pumped in and out of the fluid-filled bladder from reservoir 110-2, etc. In FIGS. 7A-7C, fluid-filled bladder 102-3 is filled with fluid 108-3 that is pumped in and out of the fluid-filled bladder from reservoir 110-3 and fluid-filled bladder 102-7 is filled with fluid 108-7 that is pumped in and out of the fluid-filled bladder from reservoir 110-7.

The material used to form fluid-filled bladders 102 may block the fluid 92 that is formed in fluid-filled chamber 82. In other words, the fluid-filled bladders 102 form a collective structure 106 that at least partially defines the boundaries for the fluid-filled chamber 82. Fluid 92 in the fluid-filled chamber 82 may be in direct contact with lens element 84, lens element 86, and fluid-filled bladders 102 of bellows structure 106 (sometimes referred to as sidewall structure 106).

The material used to form the fluid-filled bladders 102 may be sufficiently flexible to bend in response to pressure from fluid 108 and/or fluid 92. The material used to form the fluid-filled bladders may have a Young's modulus that is less than 10 GPa, less than 1 GPa, less than 0.5 GPa, less than 0.1 GPa, etc.

The material used for fluid 108 may be the same as the material used for fluid 92 or may be different than the material used for fluid 92. Fluid 108 may be a liquid, gel, or gas and may therefore sometimes be referred to as liquid 108, gel 108, or gas 108. Fluid 108 is not interposed in the optical path of light through tunable lens 72-2 and therefore may optionally be opaque (e.g., with a transparency of less than 80%, less than 50%, less than 20%, etc.). This example is merely illustrative and fluid 108 may be transparent if desired.

Fluid 108 may be pumped in and out of the fluid-filled bladders to obtain a desired displacement in the Z-direction for lens shaper 104. The displacement of lens shaper 104 in the Z-direction may be characterized by the displacement in the Z-direction between lens shaper 104 and chassis 90, the displacement in the Z-direction between lens shaper 104 and lens element 86, etc. FIGS. 7A-7C depict the displacement 112 in the Z-direction between lens shaper 104 and chassis 90. Each fluid-filled bladder 102 may have a corresponding displacement 112. FIGS. 7A-7C show displacement 112-3 associated with fluid-filled bladder 102-3 and displacement 112-7 associated with fluid-filled bladder 102-7.

FIG. 7A shows a first state for tunable lens 72-2 where displacements 112-3 and 112-7 are both equal to a first magnitude. In this state, both fluid-filled bladders 102-3 and 102-7 may be full of fluid (e.g., fluid has been pumped into the fluid-filled bladders).

FIG. 7B shows a second state where some or all of fluid 108-7 has been removed from fluid-filled bladder 102-7 relative to the first state of FIG. 7A. In other words, the volume of fluid in bladder 102-7 is lower in FIG. 7B than in FIG. 7A. Accordingly, displacement 112-7 in FIG. 7B is at a second magnitude that is lower than the first magnitude from FIG. 7A. In FIG. 7B, without the fluid in fluid-filled bladder 102-7 to retain an outward pressure on lens shaper 104, the lens shaper 104 lowers closer to chassis 90. In FIG. 7B, fluid-filled bladder 102-3 is unchanged relative to FIG. 7A.

FIG. 7C shows a third state where some or all of fluid 108-3 has been removed from fluid-filled bladder 102-3 relative to the second state of FIG. 7B. In other words, the volume of fluid in bladder 102-3 is lower in FIG. 7C than in FIG. 7B. Accordingly, displacement 112-3 in FIG. 7C is at the second magnitude that is lower than the first magnitude from FIGS. 7A and 7B. In FIG. 7C, without the fluid in fluid-filled bladder 102-3 to retain an outward pressure on lens shaper 104, the lens shaper 104 lowers closer to the chassis 90. In FIG. 7C, fluid-filled bladder 102-7 is unchanged relative to FIG. 7B.

The shape of lens element 84 changes between each of FIGS. 7A, 7B, and 7C. In general, the amount of fluid in each fluid-filled bladder may be adjusted to control a corresponding displacement in the Z-direction of the lens shaper over that fluid-filled bladder. Each bladder may be adjusted individually to allow flexibility in the shape of lens element 84. The bladders may be adjusted such that tunable lens 72-2 provides full prescription correction to a user (e.g., with both spherical correction and cylindrical correction for astigmatism).

There may optionally be adhesive layers between lens shaper 104 and the fluid-filled bladders 102, between chassis 90 and the fluid-filled bladders 102, and/or between lens shaper 104 and lens element 84.

Each bladder may have an interior wall that directly contacts fluid 108 inside the bladder and an exterior wall that directly contacts fluid 92 inside fluid-filled chamber 82.

The arrangement of FIGS. 7A-7C is merely illustrative. In one alternative arrangement, bladders 102 may be attached directly to lens element 86 instead of chassis 90. In another alternative arrangement, the bladders 102 may not be controlled individually. In other words, the displacement of one or more bladders may be tied together. Foregoing individual control of the bladders may reduce cost and complexity of the tunable lens but may mitigate the range of spherical and/or cylindrical corrections achieved by the tunable lens. In yet another possible arrangement, a single bladder 102 may be formed in a continuous ring around the tunable lens (instead of the plurality of discrete bladders shown in FIG. 6).

Figure 8:
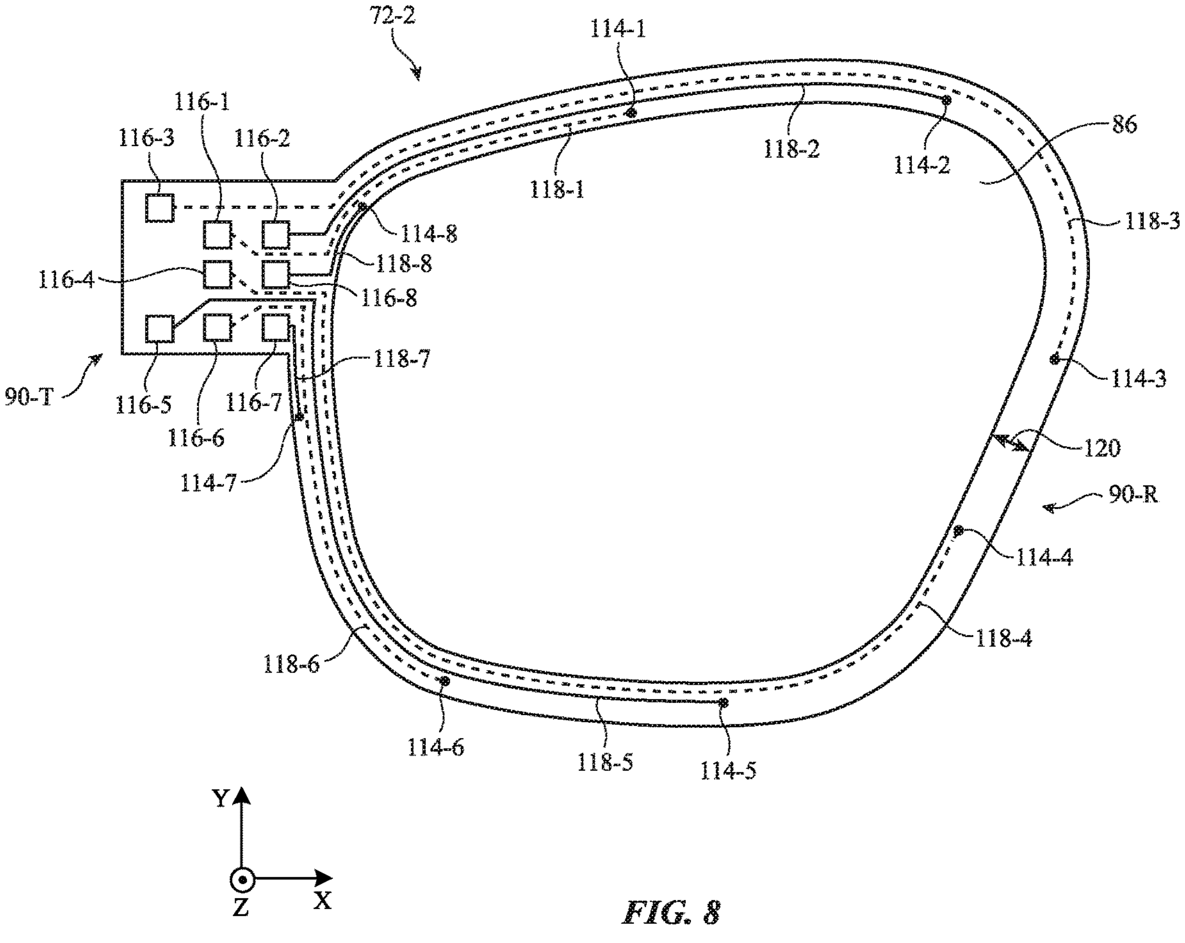
FIG. 8 is a top view of an illustrative tunable lens with fluid-controlling components and a chassis with fluid channels in accordance with some embodiments.

There are multiple options for distributing fluid into and out of each fluid-filled bladder 102. FIG. 8 is a top view of an illustrative tunable lens with fluid-controlling components and fluid channels. As shown in FIG. 8, chassis 90 may have a ring-shaped portion 90-R and a temporal portion 90-T (sometimes referred to as tab 90-T). Ring-shaped portion 90-R may have a similar footprint as lens shaper 104 and bladders 102 (e.g., a ring-shape that is irregular or non-circular). The chassis also includes a temporal portion 90-T. The temporal portion 90-T may be on the side of the tunable lens that is aligned with a user's temple when head-mounted device 10 is worn on the head of a user. The temporal portion 90-T may extend away from the ring-shaped portion 90-R and may have a larger width than ring-shaped portion 90-R.

The tunable lens may have first and second opposing sides along the X-direction. The first side (e.g., the side in the more positive X-direction of FIG. 8) may be closer to the user's nose than the user's temple when the head-mounted device is worn on the head of a user. The second side (e.g., the side in the more negative X-direction in FIG. 8) may be closer to the user's temple than the user's nose when the head-mounted device is worn on the head of a user. The temporal portion 90-T may be sufficiently large to accommodate various components while still achieving a desired form factor for head-mounted device 10. FIG. 8 shows an example where temporal portion 90-T and ring-shaped portion 90-R are coplanar. This example is merely illustrative. In another possible arrangement, temporal portion 90-T may be formed in a plane that is orthogonal to the plane of ring-shaped portion 90-R (e.g., ring-shaped portion 90-R is parallel to the XY-plane whereas temporal portion 90-T is parallel to the YZ-plane).

Each bladder 102 may have an associated inlet 114, fluid-controlling component 116, and fluid channel 118 (sometimes referred to as channel 118). Fluid-controlling component 116-1 provides fluid 108-1 to and from bladder 102-1 via channel 118-1 and through inlet 114-1 in bladder 102-1, fluid-controlling component 116-2 provides fluid 108-2 to and from bladder 102-2 via channel 118-2 and through inlet 114-2 in bladder 102-2, etc. As shown in FIG. 8, fluid-controlling components 116 are grouped in temporal portion 90-T of chassis 90 whereas channels 118 are formed in ring-shaped portion 90-R of chassis 90. With the arrangement of FIG. 8, ring-shaped portion 90-R of chassis 90 does not need to accommodate the components of fluid-controlling components 116, allowing for ring-shaped portion 90-R of chassis 90 to have a smaller width 120 than if fluid-controlling components 116 were also incorporated into ring-shaped portion 90-R. Width 120 in FIG. 8 may be less than 3 millimeters, less than 2 millimeters, less than 1 millimeter, greater than 1 millimeter, between 1 and 3 millimeters, etc.

Each fluid-controlling component 116 may be a pump, stepper motor, piezoelectric actuator, shape memory alloy (SMA), motor, hydraulic actuator, linear electromagnetic actuator, and/or other electronic component that applies a force to the fluid in corresponding fluid channel.

In some embodiments, the quantity of fluid 92 in fluid-filled chamber 82 may be static. FIGS. 7 and 8 show an example of this type. For additional flexibility when changing the shape of lens element 84, the quantity of fluid 92 in fluid-filled chamber 82 may be changed. Changing the amount of fluid 92 in fluid-filled chamber 82 during operation of tunable lens 72-2 may mitigate the amount of displacement required from each bladder 102 to achieve a desired shape for lens element 84. Mitigating the amount of displacement required from each bladder allows the size and complexity of the bladders (and corresponding fluid-controlling components) to be reduced.

As a specific example, consider the arrangement of FIGS. 6-8 where there are eight bladders and the amount of fluid in chamber 82 is static. With this arrangement, each bladder may be configured to displace the lens shaper along the Z-direction by approximately 1.2 millimeters to achieve a given range of optical powers with tunable lens 72-2. In an alternative arrangement where the amount of fluid in chamber 82 is adjustable, each bladder may be configured to displace the lens shaper along the Z-direction by approximately 0.3 millimeters to achieve the same given range of optical powers with tunable lens 72-2.

Figure 9:
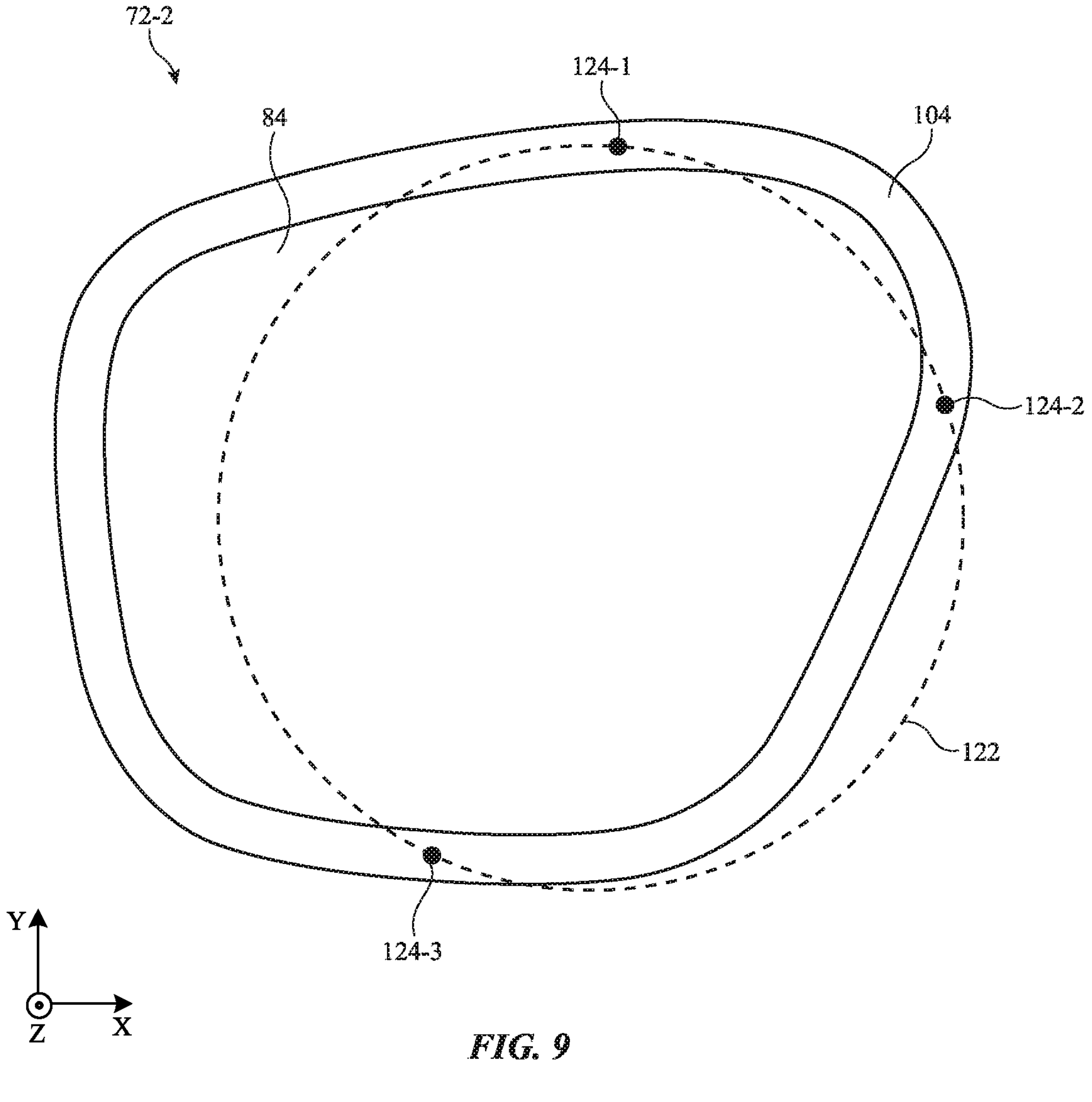
FIG. 9 is a top view of an illustrative tunable lens with a circle of invariance in accordance with some embodiments.

In some cases, adjustment of the amount of fluid in chamber 82 may be leveraged to maintain a circle of invariance with multiple points aligned with the periphery of the tunable lens. FIG. 9 is a top view of an illustrative tunable lens 72-2 with a circle of invariance 122. The circle of invariance refers to a circle of points on lens shaper 104/lens element 84 that are not displaced in the Z-direction (even while the overall shape of lens shaper 104/lens element 84 is adjusted). Points 124-1, 124-2, and 124-3 are points at which circle of invariance 122 is aligned with lens shaper 104. The size and location of the circle of invariance may be a function of the footprint of the tunable lens and the amount of fluid in chamber 82. The footprint of tunable lens 72-2 may be fixed. However, the amount of fluid in chamber 82 may be adjusted such that lens shaper 104 remains fixed in the Z-direction at positions 124-1, 124-2, and 124-3 even while the overall shape of lens shaper 104 and lens element 84 changes in the Z-direction.

Figure 10:
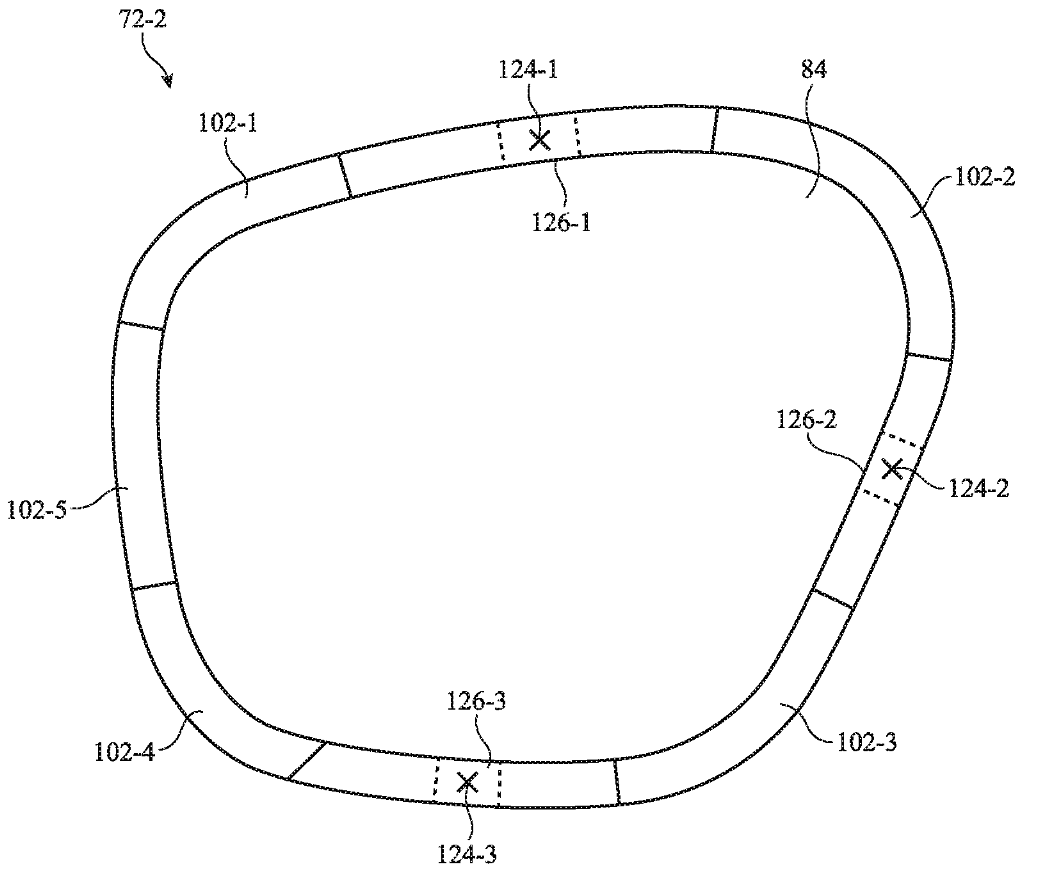
FIG. 10 is a top view of the illustrative tunable lens of FIG. 9 showing how bladders may be omitted in favor of non-adjustable components at positions along the periphery that are aligned with the circle of invariance in accordance with some embodiments.

As shown in FIG. 10, the points 124 on the circle of invariance that are aligned with the periphery of the tunable lens may allow for one or more of the bladders 102 to be omitted relative to FIGS. 6-8 (where the amount of fluid in chamber 82 is static). In FIGS. 6-8, there are eight bladders 102 that provide eight individually controlled points of displacement in the Z-direction for lens shaper 104 and lens element 84. In the arrangement of FIG. 10, the bladders aligned with points 124-1, 124-2, and 124-3 on the lens shaper may be replaced with one or more non-adjustable components 126 that maintain the lens shaper at a fixed position along the Z-direction. For example, three bladders from FIG. 6 are replaced with non-adjustable components 126 and five adjustable bladders 102-1, 102-2, 102-3, 102-4, and 102-5 are still included in tunable lens 72-2.

Non-adjustable components 126-1, 126-2, and 126-3 may include a structure formed from the same material as bladders 102 or a different material/structure than bladders 102. The non-adjustable components (sometimes referred to as rigid structures) may be sufficiently rigid to maintain a fixed displacement in the Z-direction. The non-adjustable components may at least partially define chamber 82 (e.g., the components 126 may directly contact fluid 92 in chamber 82).

Figure 11:
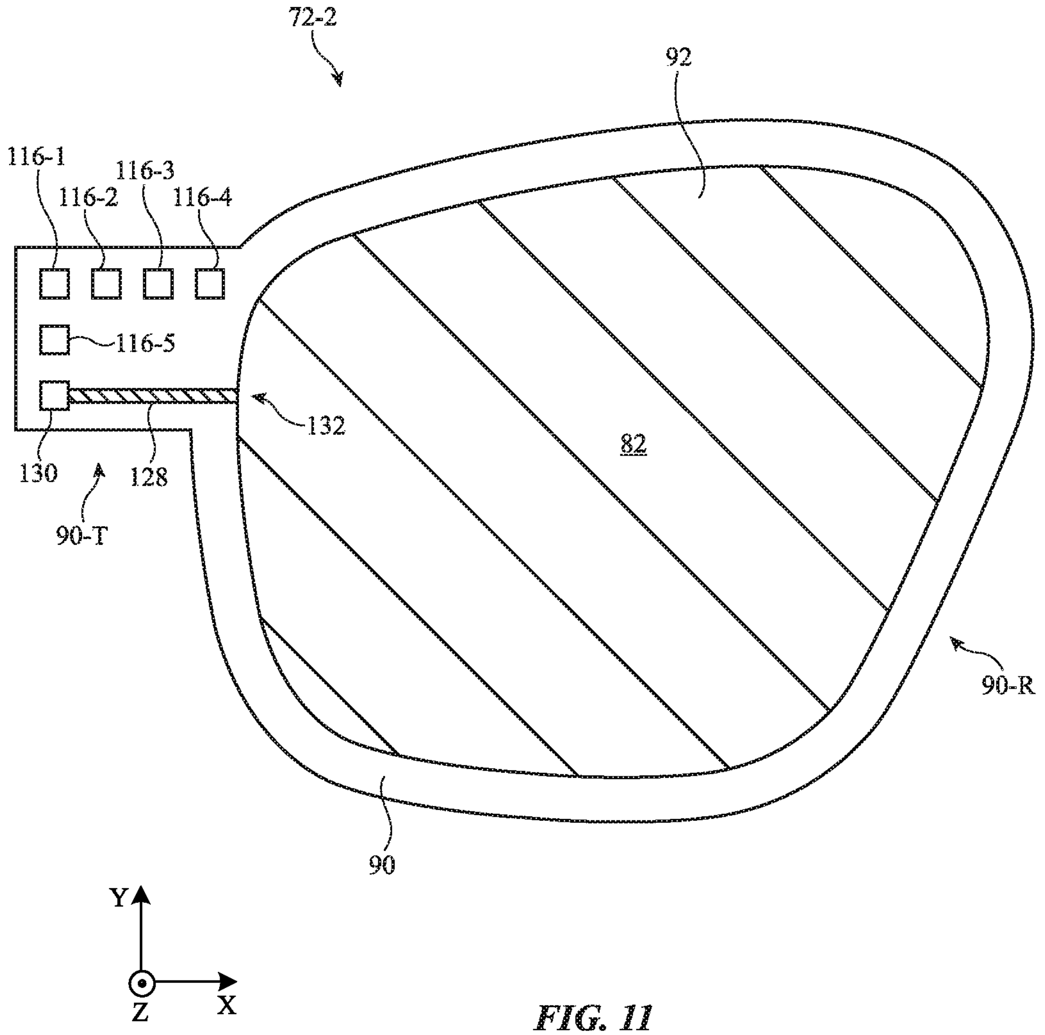
FIG. 11 is a top view of an illustrative tunable lens of the type shown in FIG. 10 showing how fluid is pumped in and out of the fluid-filled chamber in accordance with some embodiments.

FIG. 11 is a top view of an illustrative tunable lens of the type shown in FIG. 10 showing how fluid is pumped in and out of fluid-filled chamber 82. As shown in FIG. 11, similar to as in FIG. 8, temporal portion 90-T of chassis 90 includes fluid-controlling components 116-1, 116-2, 116-3, 116-4, and 116-5 that selectively fill bladders 102-1, 102-2, 102-3, 102-4, and 102-5, respectively, with fluid. The fluid-controlling components 116 may provide fluid to the bladders using fluid channels through ring-shaped chassis portion 90-R similar to as shown in FIG. 8.

In addition to fluid-controlling components 116, temporal portion 90-T of chassis 90 may include a fluid-controlling component 130 that provides fluid 92 to and from chamber 82. As one example, fluid-controlling component 130 may provide fluid to a channel 128 that connects to inlet 132 in chamber 82. Fluid-controlling component 130 may selectively add and remove fluid to fluid-filled chamber 82.

Fluid-controlling component 130 may be a pump, stepper motor, piezoelectric actuator, motor, shape memory alloy (SMA), linear electromagnetic actuator, and/or other electronic component that applies a force to the fluid in corresponding fluid channel.

Figure 12:
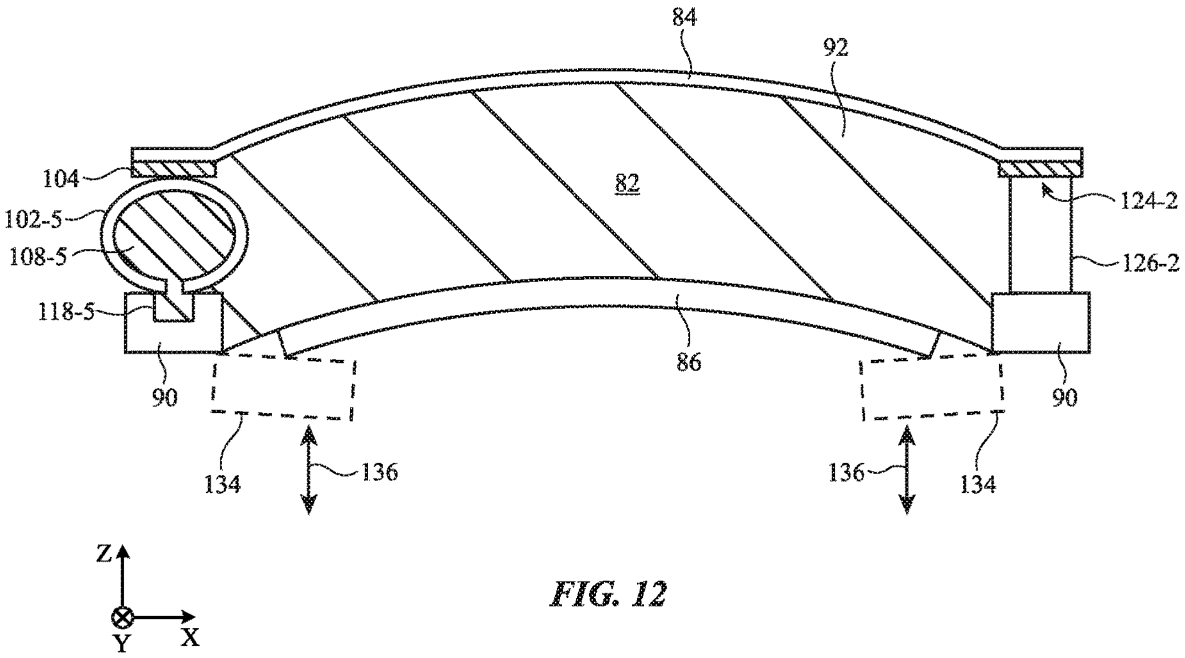
FIG. 12 is a cross-sectional side view of a tunable lens where the amount of fluid in a primary chamber is static and, to allow multiple points along the lens shaper to be fixed, the position of a lens element is adjustable in accordance with some embodiments.

FIG. 11 shows an example where the amount of fluid in chamber 82 is adjusted, allowing points 124-1, 124-2, 124-3 along the lens shaper to be fixed in the Z-direction. This example is merely illustrative. In another possible arrangement, the amount of fluid in chamber 82 may be static and, to allow points 124-1, 124-2, 124-3 along the lens shaper to be fixed in the Z-direction, the position of lens element 86 is adjustable along the Z-direction. FIG. 12 is a cross-sectional side view of a tunable lens of this type.

FIG. 12 shows a bladder 102-5 that is attached between chassis 90 and lens shaper 104. The amount of fluid in bladder 102-5 may be adjusted to change the displacement of lens shaper 104 in the Z-direction. Additionally, FIG. 12 shows non-adjustable component 126-2 that maintains lens shaper 104 at a fixed displacement in the Z-direction at point 124-2 on the circle of invariance (e.g., as discussed in connection with FIGS. 9 and 10). Similarly, a non-adjustable component 126-1 may maintain lens shaper 104 at a fixed displacement in the Z-direction at point 124-1 on the circle of invariance and a non-adjustable component 126-3 may maintain lens shaper 104 at a fixed displacement in the Z-direction at point 124-3 on the circle of invariance. One or more adhesive layers may be interposed between non-adjustable component 126-2 and lens shaper 104 and/or between non-adjustable component 126-2 and chassis 90. In one possible arrangement, a portion of chassis 90 forms the non-adjustable components 126.

FIG. 12 additionally shows how one or more positioners 134 may be included to bias lens element 86 towards and away from lens element 84 (e.g., along direction 136 parallel to the Z-axis). Shifting lens element 86 in the negative Z-direction (away from lens element 84) may achieve the same effect as removing fluid 92 from chamber 82 in maintaining the position of circle of invariance 122. Shifting lens element 86 in the positive Z-direction (towards lens element 84) may achieve the same effect as adding fluid 92 to chamber 82 in maintaining the position of circle of invariance 122. Each positioner 134 may be a stepper motor, piezoelectric actuator, motor, linear electromagnetic actuator, shape memory alloy (SMA) and/or other electronic component for adjusting the position of lens element 86.

In FIGS. 8 and 11, fluid-controlling elements 116 that adjust the amount of fluid in each bladder 102 are positioned in temporal portion 90-T of chassis 90. The fluid-controlling elements 116 use channels 118 that extend through ring-shaped portion 90-R of chassis 90 to pump fluid in and out of each bladder 102. This example is merely illustrative. In another possible arrangement, shown in FIG. 13, each fluid-controlling component may be positioned within ring-shaped portion 90-R of chassis 90. Each fluid-controlling component may be adjacent to a respective bladder, mitigating the need for extended channels running along the ring-shaped portion of the chassis.

Figure 13:
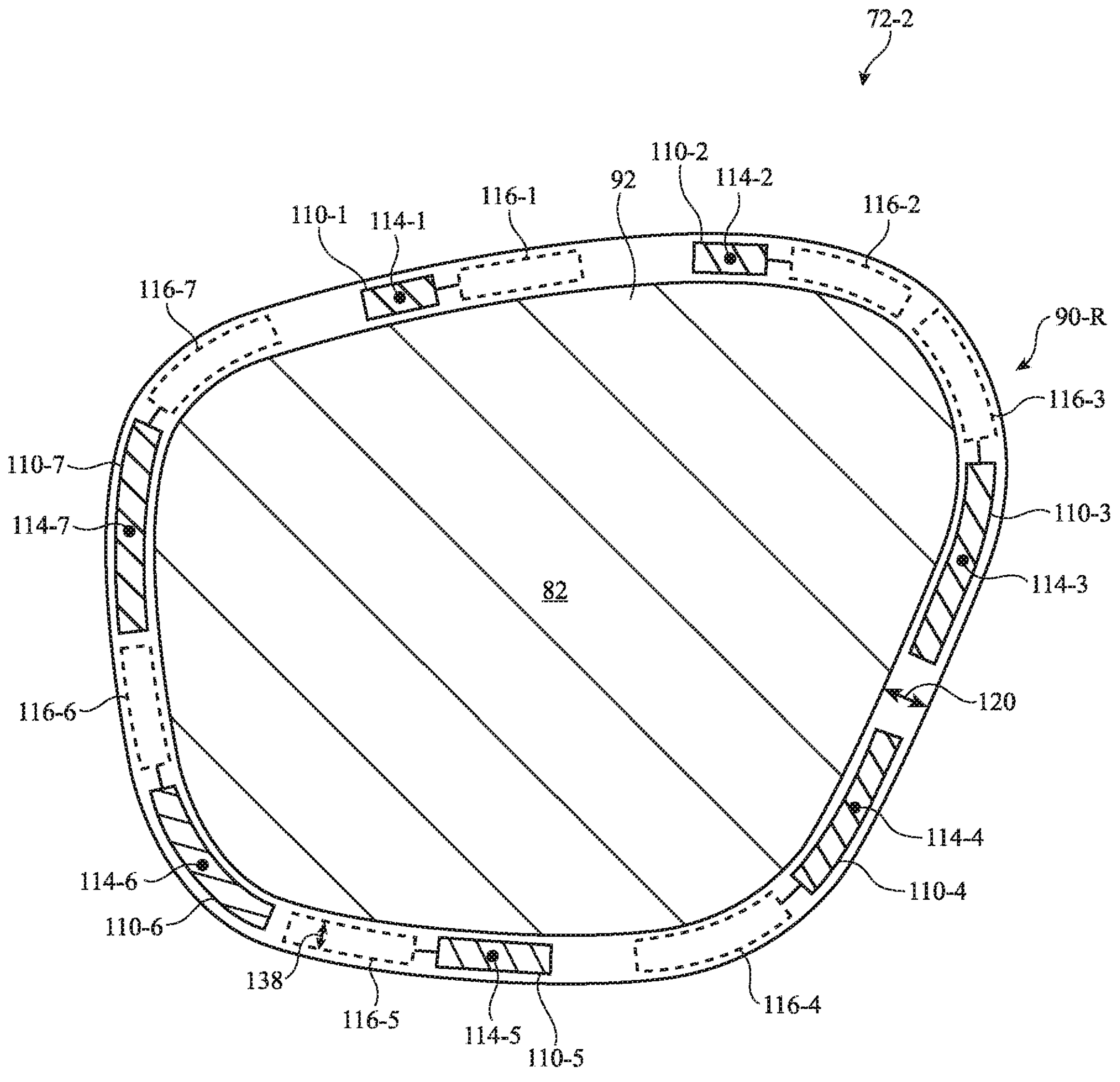
FIG. 13 is a top view of an illustrative tunable lens with a chassis, adjustable fluid-filled bladders, and fluid-controlling components that are positioned within a ring-shaped portion of the chassis in accordance with some embodiments.

Each fluid-controlling component 116 in FIG. 13 may direct fluid between a respective reservoir 110 and a respective bladder 102 through a respective inlet 114 for that bladder. Fluid-controlling component 116-1 directs fluid between reservoir 110-1 and a respective bladder through a respective inlet 114-1, fluid-controlling component 116-2 directs fluid between reservoir 110-2 and a respective bladder through a respective inlet 114-2, etc.

With the arrangement of FIG. 13, the size of temporal portion 90-T from FIGS. 8 and 11 may be reduced (or the temporal portion 90-T may be omitted entirely as in FIG. 13). It is noted that the arrangement of FIG. 13 may be used in combination with a chamber 82 that has a static amount of fluid 92 (with or without a movable lens element 86 as in FIG. 12) or an adjustable amount of fluid 92 (as in FIG. 11).

As previously mentioned, it may be desirable to maintain a small width 120 for ring-shaped chassis portion 90-R. A limiting factor in the size requirements for width 120 may be the width 138 of fluid-controlling components 116. Width 120 may need to be greater than or equal to width 138 to accommodate the fluid-controlling components.

To mitigate the width 138 of fluid-controlling component 116, the fluid-controlling component may be formed from a stepper motor with two motor subassemblies that each have a ring-shaped magnet that is interposed between two coils. With this type of arrangement (shown in FIGS. 14A-14D), the maximum width 138 of the fluid-controlling component 116 may be less than 3 millimeters, less than 2.5 millimeters, greater than 1 millimeter, between 2.0 and 2.5 millimeters, etc.

Figure 14A:
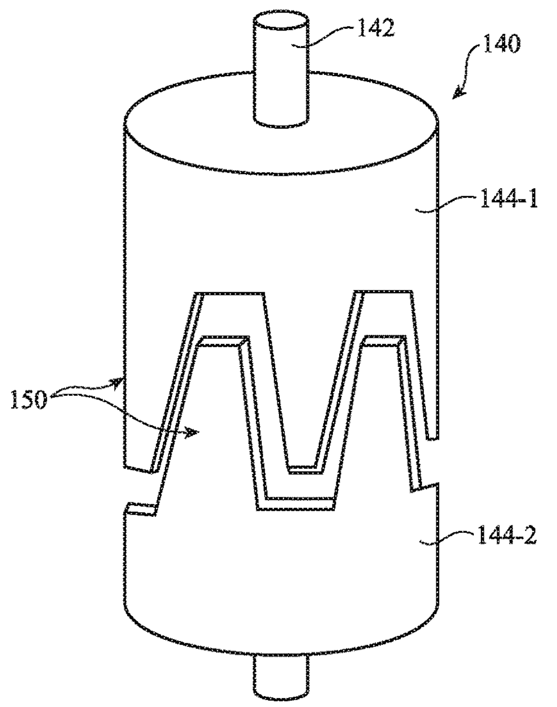
FIG. 14A is a perspective view of an illustrative motor subassembly in accordance with some embodiments.
Figure 14B:
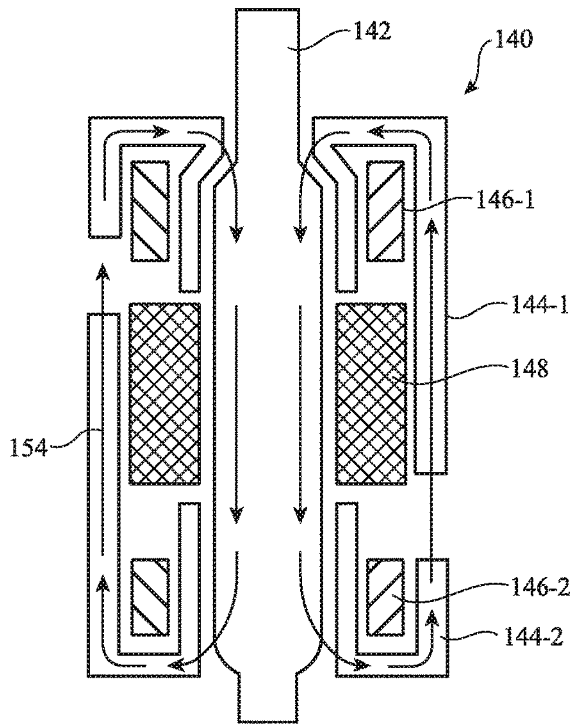
FIG. 14B is a cross-sectional side view of the illustrative motor subassembly of FIG. 14A in accordance with some embodiments.
Figure 14C:
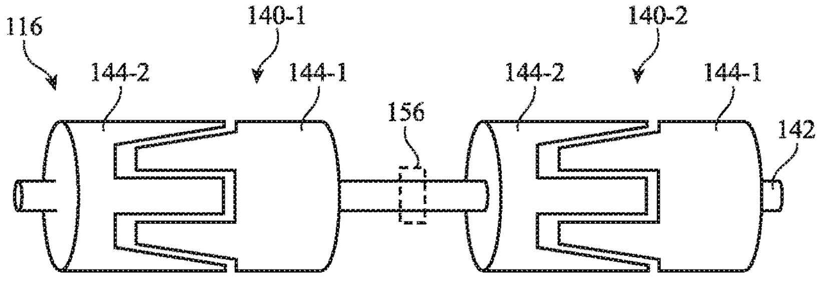
FIG. 14C is a perspective view of a stepper motor that includes two motor subassemblies of the type shown in FIGS. 14A and 14B in accordance with some embodiments.
Figure 14D:
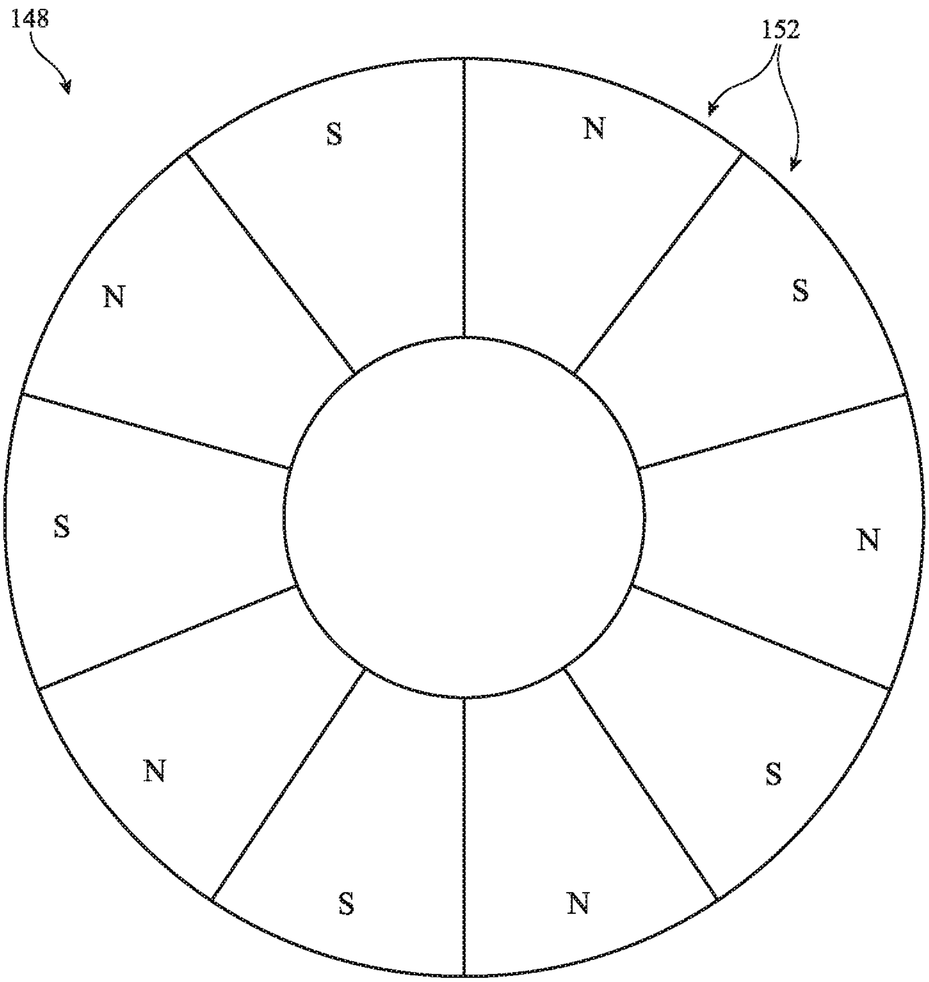
FIG. 14D is a top view of an illustrative ring-shaped magnet that may be used in the motor subassembly shown in FIGS. 14A and 14B in accordance with some embodiments.

FIG. 14A is a perspective view of an illustrative motor subassembly, FIG. 14B is a cross-sectional side view of the illustrative motor subassembly of FIG. 14A, FIG. 14C is a perspective view of a stepper motor that includes two motor subassemblies of the type shown in FIGS. 14A and 14B, and FIG. 14D is a top view of an illustrative ring-shaped magnet that may be used in the motor subassembly shown in FIGS. 14A and 14B.

As shown in FIG. 14A, motor subassembly 140 may include a central rotor 142 that extends through chassis 144-1 and 144-2 (sometimes referred to as yokes 144) parallel to an axis. Each chassis has teeth 150 that interlock with the teeth of the opposing chassis. In other words, the teeth of chassis 144-1 extend into the gaps between the teeth of chassis 144-2. Simultaneously, the teeth of chassis 144-2 extend into the gaps between the teeth of chassis 144-1.

As shown in FIG. 14B, rotor 142 may extend through a ring-shaped magnet in addition to chassis 144-1 and 144-2. Ring-shaped magnet 148 may be a multipole magnet with a plurality of sections (sometimes referred to as segments) having alternating polarity. FIG. 14D shows an example where magnet 148 has ten sections 152 that alternate between a first polarity (denoted by the 'N' in FIG. 14D) and a second, opposite polarity (denoted by the 'S' in FIG. 14D) around the circumference of the magnet. Sections 152 may sometimes be referred to as radial sections.

Each chassis may have a number of teeth that is equal to the number of sections in the magnet divided by two. As an example, when there are ten sections in magnet 148 then chassis 144-1 may have five teeth and five corresponding gaps between the teeth. Similarly, chassis 144-2 may have five teeth and five corresponding gaps between the teeth. Accordingly, the sum of the number of teeth in chassis 144-1 and chassis 144-2 is equal to the number of sections 152 in magnet 148.

Returning to FIG. 14B, the motor subassembly 140 may also include a first coil 146-1 and a second coil 146-2. Each coil may be formed from a conductive material (e.g., copper) and may have any desired number of turns (e.g., more than 20 turns, more than 40 turns, more than 80 turns, more than 100 turns, less than 100 turns, between 80 turns and 100 turns, etc.). The coils may be operated in unison, meaning that a current applied to coil 146-1 is also applied to coil 146-2 (e.g., with the same magnitude and direction). Rotor 142 extends through respective openings in chassis 144-1, chassis 144-2, coil 146-1, coil 146-2, and magnet 148, Magnet 148 is interposed between coils 146-1 and 146-2 along a direction parallel to the elongated direction of the rotor. Magnet 148 does not overlap coil 146-1 within a plane that is orthogonal to the elongated direction of the rotor and magnet 148 does not overlap coil 146-2 within a plane that is orthogonal to the elongated direction of the rotor.

As shown in FIG. 14C, the stepper motor may include a first motor subassembly 140-1 and a second motor subassembly 140-2. Each motor subassembly may have the structure depicted in FIGS. 14A and 14B. During operation of stepper motor 116, the coils may be operated according to an operating sequence. First, a current may be supplied in a first direction (e.g., clockwise) through both coils 146-1 and 146-2 of the first subassembly 140-1. Next, a current may be supplied in the first direction through both coils 146-1 and 146-2 of the second subassembly 140-2. Next, a current may be supplied in a second direction that is opposite the first direction (e.g., counter-clockwise) through both coils 146-1 and 146-2 of the first subassembly 140-1. Next, a current may be supplied in the second direction through both coils 146-1 and 146-2 of the second subassembly 140-2. In the example where ring-shaped magnet 148 has 10 sections, repeating this sequence five times may cause one complete revolution of rotor 140.

It is noted that when a current is applied to coils 146-1 and 146-2, a magnetic field is induced as indicated by magnetic field lines 154 in FIG. 14B. As shown by the magnetic field lines, the magnetic loop induced by the current applied to the coils may include rotor 142, chassis 144-1 and chassis 144-2. Because the rotor is part of the magnetic field return path during operation of motor 116, the rotor may be formed from a material with a relatively high magnetic saturation. For example, the rotor may be formed from an alloy of cobalt, iron, and vanadium (e.g., cobalt steel). As one example, the rotor may include 49% iron, 49% cobalt, and 2% vanadium. The magnetic saturation point for the material used to form the rotor may be greater than 1 tesla (T), greater than 1.5 T, greater than 2 T, less than 3 T, between 2 T and 3 T, etc.

There may be a joint 156 between motor subassemblies 140-1 and 140-2 if desired. The joint may allow motor subassemblies 140-1 and 140-2 to be positioned along a curved or bent portion of the periphery of tunable lens element 72-2. Each motor subassembly 140 may have a maximum diameter (width) of less than 3 millimeters, less than 2.5 millimeters, greater than 1 millimeter, between 2.0 and 2.5 millimeters, etc.

Figure 15A:
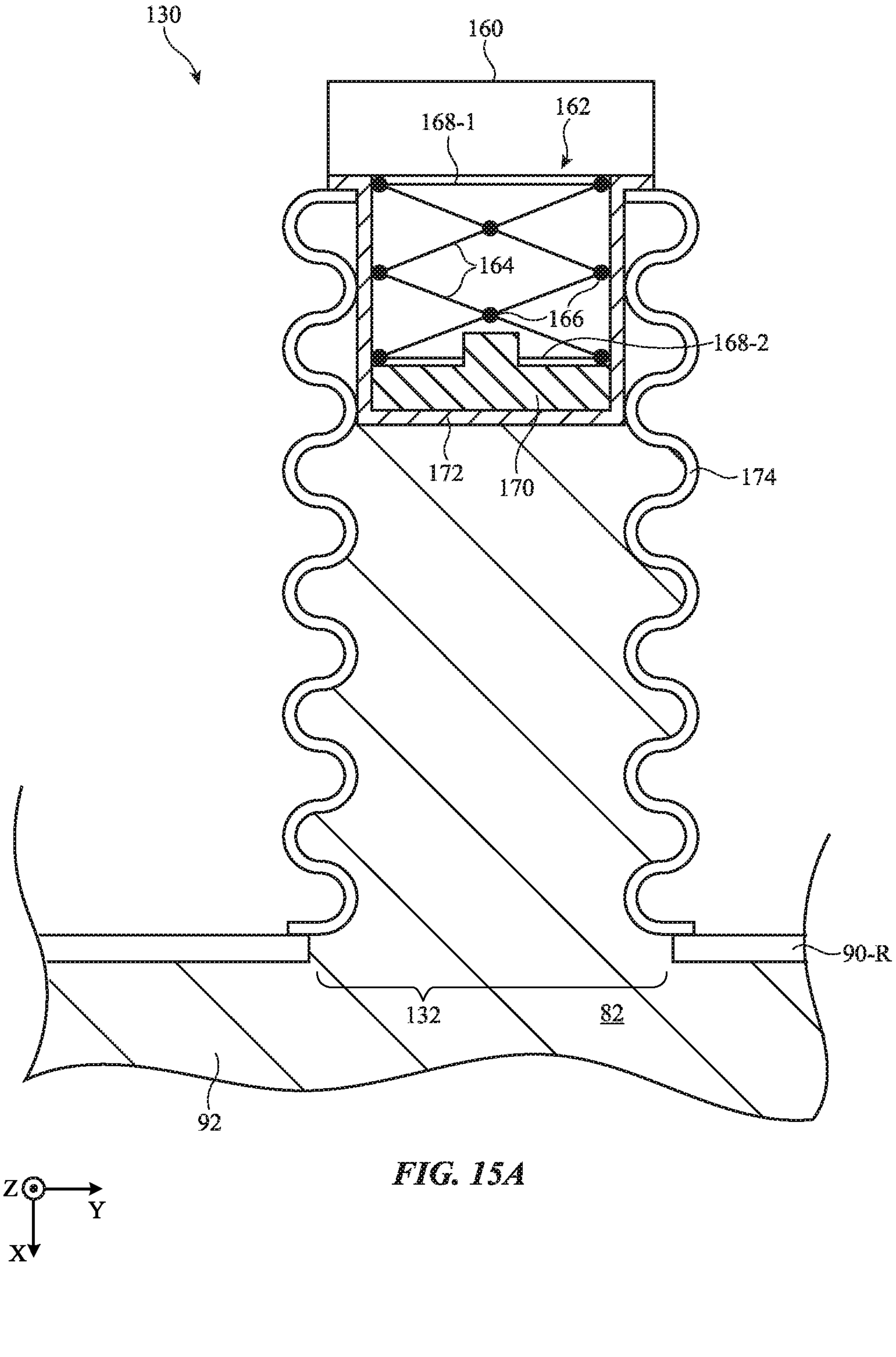
FIGS. 15A and 15B show an illustrative fluid-controlling component that directs fluid into and out of a chamber in accordance with some embodiments.
Figure 15B:
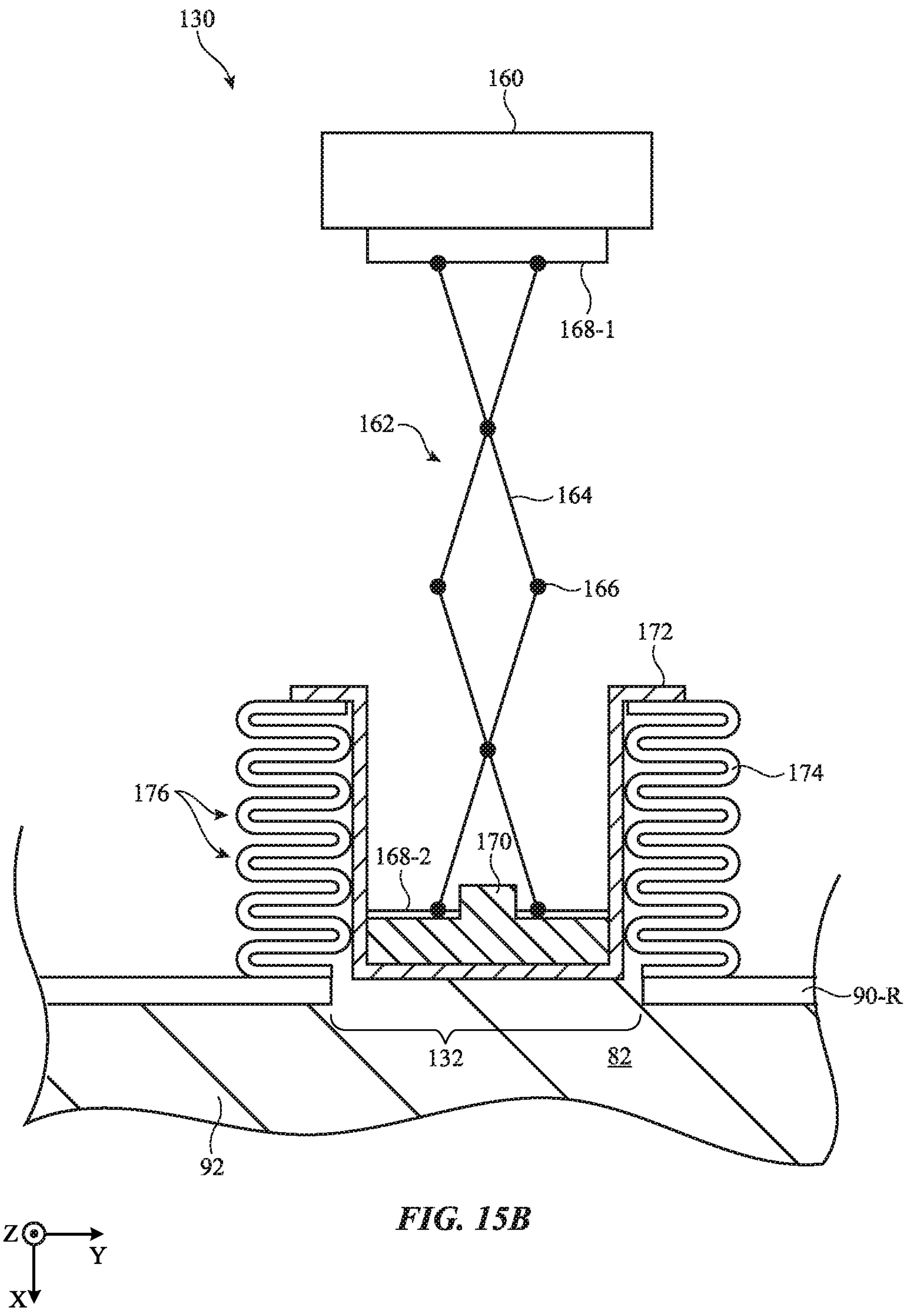

FIGS. 15A and 15B show an example of a fluid-controlling component 130 that directs fluid into and out of chamber 82 (e.g., as in FIG. 11). The fluid-controlling component 130 may be formed on temporal portion 90-T of chassis 90, as an example. As shown in FIG. 15A, the fluid-controlling component may include an actuator 160 with a scissor jack portion 162.

As shown in FIG. 15A, the scissor jack portion 162 may include rigid segments 164 that are connected at joints 166. At the top and bottom of the scissor jack, the joints may be configured to slide horizontally (e.g., along the X-direction) along crossbars 168. Actuator 160 may push the joints on crossbar 168-1 together to cause the scissor jack to elongate in the X-direction and may push the joints on crossbar 168-1 apart to cause the scissor jack to shorten in the X-direction. Crossbar 168-2 may be aligned with a rigid block 170 that biases a layer 172. Crossbar 168-2 may also be aligned with two joints 168 that slide along crossbar 168-2.

Layer 172 may be attached to flexible bladder 174 and may form a watertight seal (sometimes referred to as a hermetic seal) that prevents fluid from reaching the electronic components of actuator 160. Layer 172 may be formed from an elastomeric material, a rigid material, or a semirigid material. As shown in FIGS. 15A and 15B, flexible bladder 174 includes a plurality of ribs 176 that allow the flexible bladder to be selectively compressed and expanded along the X-direction. The ribs 176 are protruding portions separated by intervening gaps in the flexible bladder.

As shown in FIG. 15A, bladder 174 may be attached to ring-shaped chassis portion 90-R at a point that is aligned with inlet 132. The fluid-controlling component 130 (sometimes referred to as scissor jack actuator 130) may selectively force fluid 92 from inside flexible bladder 174 into chamber 82. In FIG. 15A, the length of scissor jack portion 162 along the X-direction is at a minimum. Accordingly, the amount of fluid that fits in the volume of bladder 174 is at a maximum and the amount of fluid in chamber 82 is at a minimum. Between FIGS. 15A and 15B, the actuator 160 may selectively bias rigid block 170 and layer 172 in the positive X-direction to increase the length of scissor jack portion 162 and shrink the volume of bladder 174. In FIG. 15B, the length of scissor jack portion 162 along the X-direction is at a maximum. Accordingly, the amount of fluid that fits in the volume of bladder 174 is at a minimum and the amount of fluid in chamber 82 is at a maximum.

With the arrangement of FIGS. 15A and 15B, the fluid-controlling component 130 (sometimes referred to as a scissor jack actuator) is able to reliably move fluid in and out of chamber 82 through inlet 132 without exposing any sensitive components to the fluid. Additionally, the scissor jack portion may have a smaller overall length when compressed than when extended. This mitigates the overall volume in head-mounted device 10 needed to accommodate fluid-controlling component 130. The scissor jack portion may also extend into the flexible bladder, which again reduces the overall volume in head-mounted device 10 needed to accommodate fluid-controlling component 130.

In the example of FIGS. 6-8, there are multiple discrete fluid-filled bladders that extend around the periphery of the adjustable lens. Including multiple discrete fluid-filled bladders may enable more degrees of freedom in controlling the shape of lens element 84. However, in some arrangements it may be preferable to instead have a single fluid-filled bladder that extends around the entire periphery of the adjustable lens. The amount of fluid in the single fluid-filled bladder may adjust the curvature of lens element 84. Having only one fluid-filled bladder may reduce the range of possible shapes for the lens element but has the benefit of an easier control scheme (e.g., due to less required components, less volume in the device required to accommodate the control components, less power required to operate the control components, etc.).

Figure 16:
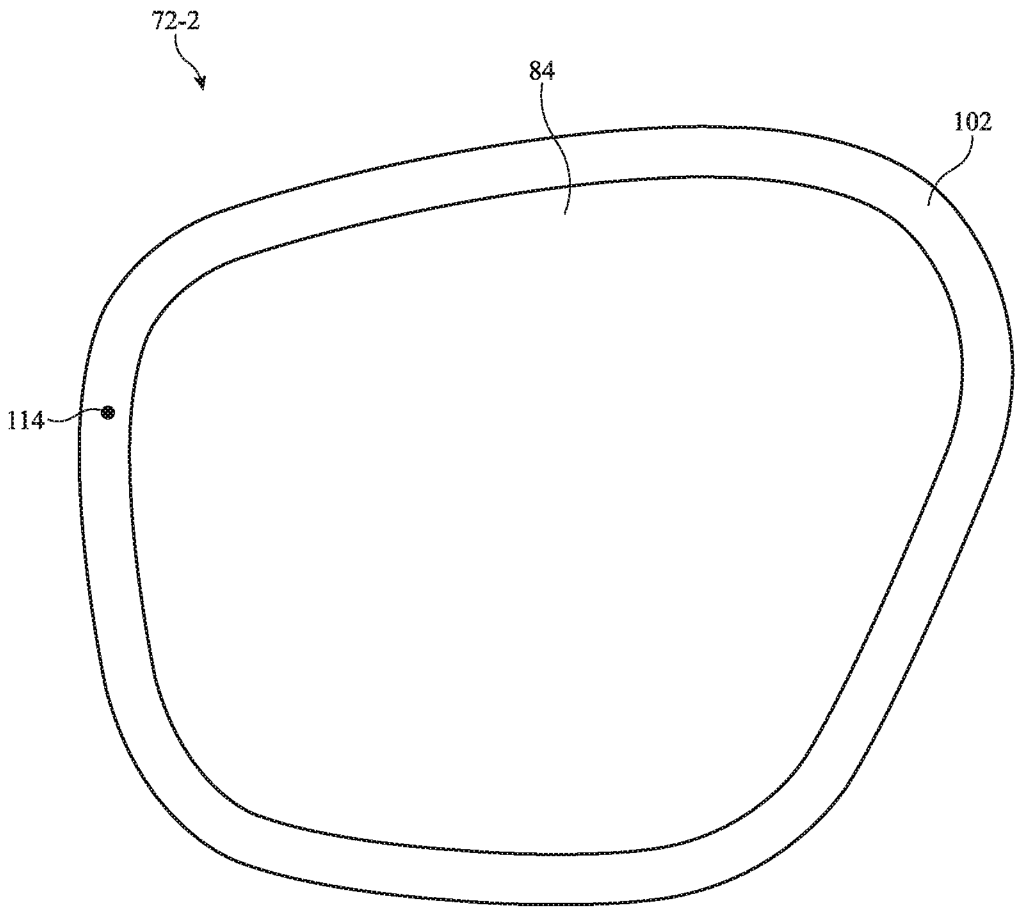
FIG. 16 is a top view of an illustrative tunable lens with a single fluid-filled bladder that extends around the periphery of the tunable lens in accordance with some embodiments.

FIG. 16 is a top view of an illustrative fluid-filled bladder that extends around the entire periphery of adjustable lens 72-2. As shown in FIG. 16, fluid-filled bladder 102 (sometimes referred to as actuator 102, hydraulic actuator 102, bladder 102, etc.) may have an annular or ring shape with the fluid-filled bladder surrounding a central opening. In general, the footprint of the fluid-filled bladder 102 may have any desired shape (e.g., circular, elliptical, or irregular). In the example of FIG. 16, the footprint of the fluid-filled bladder 102 has an irregular shape (e.g., a non-uniform radius around the ring shape). Lens 72-2 may sometimes be referred to as non-circular shaped, non-elliptical shaped, irregular shaped, etc.

Fluid-filled bladder 102 may optionally define a sidewall for fluid-filled chamber 82 of tunable lens 72-2. In other words, fluid 92 in fluid-filled chamber 82 may directly contact the fluid-filled bladder 102 in addition to lens elements 84 and 86. The fluid-filled bladder may sometimes be referred to as a bellows structure. The fluid-filled bladder 102 is sufficiently compliant to permit adjustment to the shape of lens element 84. However, the fluid-filled bladder maintains a stable boundary for the fluid 92 inside fluid-filled chamber 82.

Figure 17:
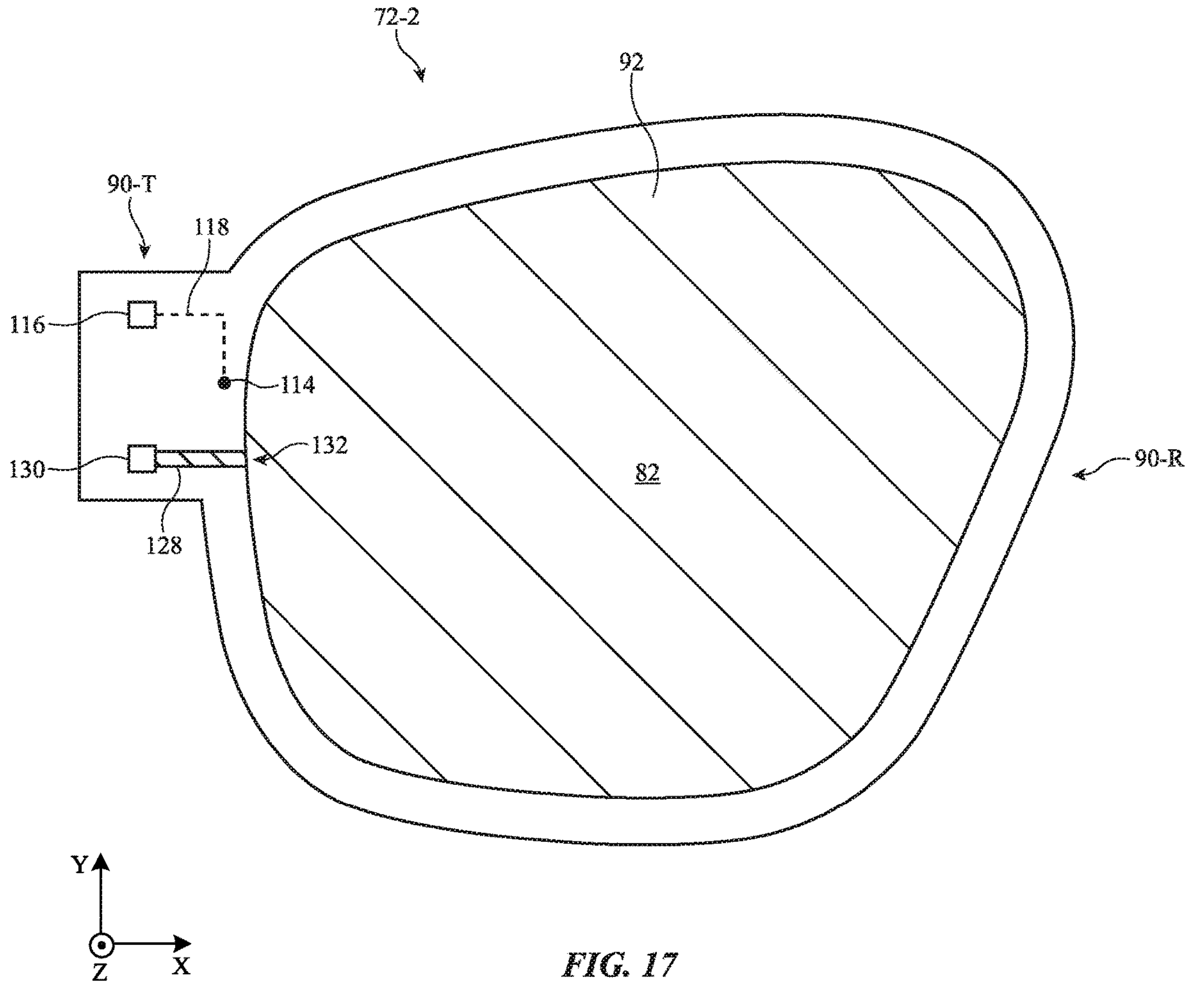
FIG. 17 is a top view of an illustrative tunable lens with a single fluid-filled bladder and fluid-controlling components in accordance with some embodiments.

Because a single fluid-filled bladder 102 is used in adjustable lens 72-2, the fluid-filled bladder 102 may have a single inlet 114 that enables fluid to be pumped in and out of the fluid-filled bladder. FIG. 17 is a top view of an illustrative tunable lens 72-2 with fluid-controlling components and a fluid channel. As shown in FIG. 17, chassis 90 may have a ring-shaped portion 90-R and a temporal portion 90-T (sometimes referred to as tab 90-T). Ring-shaped portion 90-R may have a similar footprint as bladder 102 from FIG. 16 (e.g., a ring-shape that is irregular or non-circular). The chassis also includes a temporal portion 90-T. The temporal portion 90-T may be on the side of the tunable lens that is aligned with a user's temple when head-mounted device 10 is worn on the head of a user. The temporal portion 90-T may extend away from the ring-shaped portion 90-R and may have a larger width than ring-shaped portion 90-R.

Fluid-filled bladder 102 may have an associated inlet 114, fluid-controlling component 116, and fluid channel 118 (sometimes referred to as channel 118). Channel 118 is defined by chassis 90. Fluid-controlling component 116 provides fluid to and from bladder 102 via channel 118 and through inlet 114 in bladder 102. As shown in FIG. 17, fluid-controlling component 116 may be positioned in temporal portion 90-T of chassis 90. Channel 118 may be formed between fluid-controlling component 116 and inlet 114. Because there is only one fluid-filled bladder in the adjustable lens of FIGS. 16 and 17, temporal portion 90-T of the chassis only needs to accommodate one fluid-controlling component 116 and channel 118. The minimum space requirements for temporal portion 90-T may therefore be smaller in FIGS. 16 and 17 than in FIG. 8 (when eight discrete fluid-filled bladders are used and the temporal portion 90-T accommodates eight corresponding fluid-controlling components).

Fluid-controlling component 116 in FIG. 17 may be a pump, stepper motor, piezoelectric actuator, shape memory alloy (SMA), motor, hydraulic actuator, linear electromagnetic actuator, and/or other electronic component that applies a force to the fluid in corresponding fluid channel.

Temporal portion 90-T in FIG. 17 may include a fluid-controlling component 130 that provides fluid 92 to and from chamber 82. As one example, fluid-controlling component 130 may provide fluid to a channel 128 that connects to inlet 132 in chamber 82. Fluid-controlling component 130 may selectively add and remove fluid to fluid-filled chamber 82. Fluid-controlling component 130 may optionally have the arrangement shown in FIGS. 15A and 15B, for example.

An example is shown in FIGS. 7A-7C where a lens shaping element 104 is attached between fluid-filled bladders 102 and lens element 84. This type of arrangement may be used for any type of fluid-filled bladders (e.g., multiple discrete fluid-filled bladders may have this arrangement as in FIGS. 7A-7C, a single fluid-filled bladder that extends around the entire periphery of the adjustable lens as in FIG.

16 may have this arrangement, etc.). However, this arrangement is merely illustrative and the fluid-filled bladders described herein may have other arrangements to manipulate lens element 84 if desired.

Figure 18:
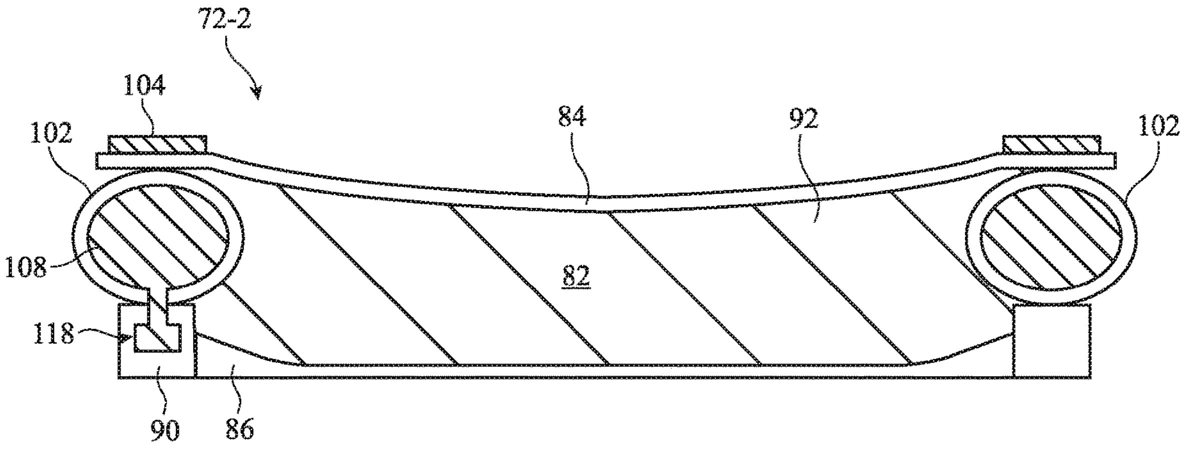
FIG. 18 is a cross-sectional side view of an illustrative tunable lens with a lens element interposed between an adjustable fluid-filled bladder and a lens shaping element in accordance with some embodiments.

As one example, shown in FIG. 18, the lens shaping element 104 may be formed above lens element 84 instead of below the lens element as in FIGS. 7A-7C. As shown in FIG. 18, fluid-filled bladder 102 is formed between flexible lens element 84 and rigid lens element 86. Fluid-filled bladder 102, lens element 84, and lens element 86 collectively define chamber 82 that is filled with fluid 92. FIG. 18 shows how chassis 90 may have a channel 118 to provide fluid 108 to and from fluid-filled bladder 102.

As shown in FIG. 18, lens element 84 is interposed between fluid-filled bladder 102 and lens shaping element 104. Adhesive may be interposed between lens element 84 and fluid-filled bladder 102 to attach the lens element to the fluid-filled bladder. Adhesive may be interposed between lens element 84 and lens shaping element 104 to attach the lens element to the lens shaping element.

The arrangement of FIG. 18 may be used for any type of fluid-filled bladders (e.g., multiple discrete fluid-filled bladders as in FIG. 6 may have this arrangement, a single fluid-filled bladder that extends around the entire periphery of the adjustable lens as in FIG. 16 may have this arrangement, etc.).

Figure 19:
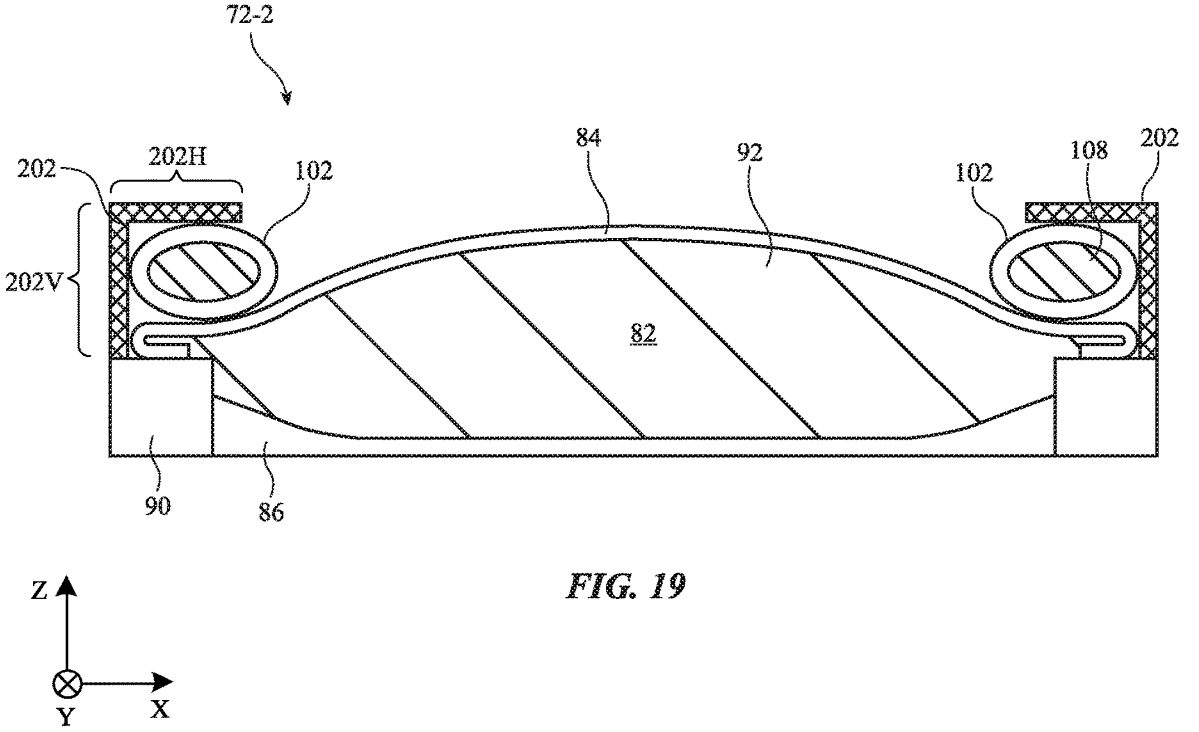
FIG. 19 is a cross-sectional side view of an illustrative tunable lens with a rigid frame and an adjustable fluid-filled bladder in accordance with some embodiments.
Figure 20:
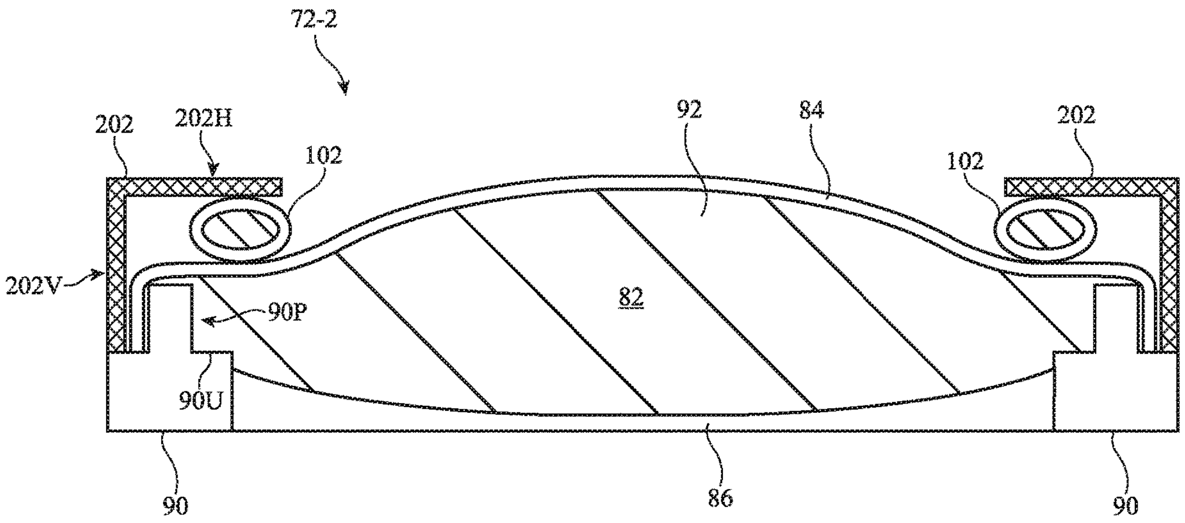
FIG. 20 is a cross-sectional side view of an illustrative tunable lens with a rigid frame, an adjustable fluid-filled bladder, and a chassis having a protrusion in accordance with some embodiments.

FIGS. 19 and 20 show examples of adjustable lens elements with rigid frames. As shown in FIG. 19, rigid frame 202 may be attached to an upper surface of chassis 90. Rigid frame 202 may extend around the periphery of the tunable lens (and therefore has a similar footprint as chassis 90 and fluid-filled bladder 202). Rigid frame 202 has a vertical portion 202V and a horizontal portion 202H. The rigid frame is therefore L-shaped and may sometimes be referred to as L-shaped frame 202, rigid structure 202, L-shaped structure 202, etc. Portions 202H and 202V are orthogonal in FIG. 19, though the portions may be at non-orthogonal angles if desired.

Fluid-filled bladder 102 may be interposed between horizontal portion 202H of rigid frame 202 and lens element 84. Lens element 84 may be attached to a lower surface of fluid-filled bladder 102, a side surface of vertical portion 202V of rigid frame 202, and/or an upper surface of chassis 90. Adhesive may be included at one or more of these locations to attach lens element 84 to fluid-filled bladder 102, rigid frame 202, and/or chassis 90.

In FIGS. 7A-7C, adding fluid to a fluid-filled bladder increases a displacement between lens elements 84 and 86. With the arrangement of FIG. 19, adding fluid to fluid-filled bladder 102 pushes lens element 84 towards chassis 90 and lens element 86 and therefore decreases a displacement between lens elements 84 and 86.

As shown in FIG. 20, chassis 90 may optionally include a protrusion 90P. Protrusion 90P may have a sidewall that extends parallel to vertical portion 202V of rigid frame 202. Lens element 84 may have a portion that extends between protrusion 90P and vertical portion 202V of rigid frame 202. In FIG. 20, lens element 84 may be attached to a lower surface of fluid-filled bladder 102, a side surface of vertical portion 202V of rigid frame 202, a side surface of chassis protrusion 90P, and/or an upper surface 90U of chassis 90. Adhesive may be included at one or more of these locations to attach lens element 84 to fluid-filled bladder 102, rigid frame 202, protrusion 90P, and/or chassis 90.

Lens element 84 may optionally be biaxially strained when bonded to protrusion 90P. Pre-straining the lens element before bonding in this way may simplify the manufacturing process and improve performance of adjustable lens 72-2.

The example in FIG. 20 of protrusion 90P being integral with chassis 90 is merely illustrative. If desired, protrusion 90P may be formed as a separate component and/or from a different material than chassis 90. The protrusion may be attached to upper surface 90U of chassis 90 using adhesive or another desired attachment technique.

The arrangement of FIGS. 19 and 20 may be used for any type of fluid-filled bladders (e.g., multiple discrete fluid-filled bladders as in FIG. 6 may have either of these arrangements, a single fluid-filled bladder that extends around the entire periphery of the adjustable lens as in FIG. 16 may have either of these arrangements, etc.).

When a single fluid-filled bladder is used as shown in the example of FIG. 16, the fluid-filled bladder may have one or more properties that vary along the length of the bladder to enable the bladder to have different heights at different positions along its length. This effectively causes non-uniform displacement of lens element 84 by fluid-filled bladder 102 at uniform fluid pressure, which may be desirable to cause lens element 84 to have a target curvature and/or shape.

Figure 21A:
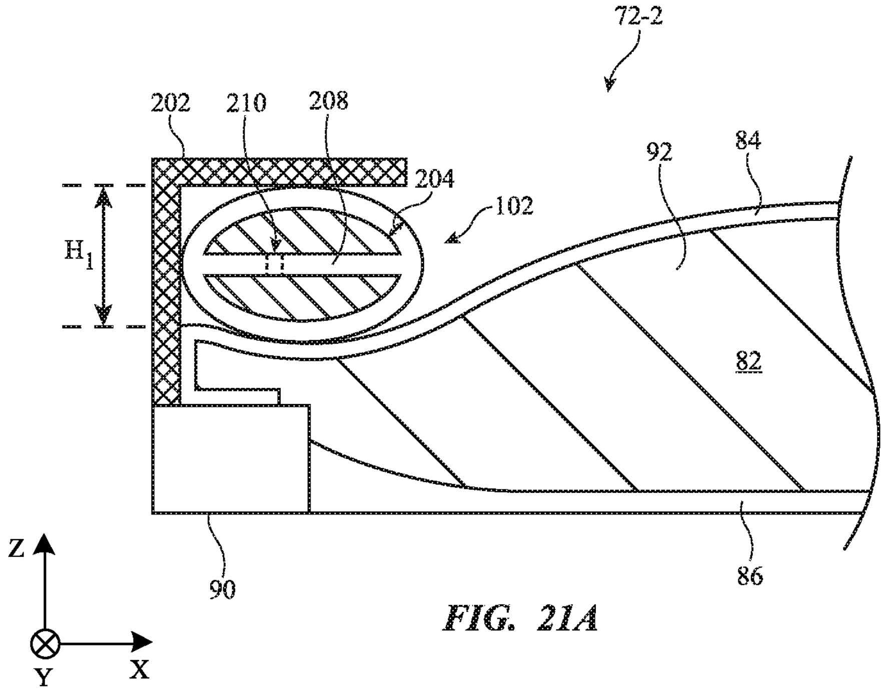
FIG. 21A is a cross-sectional side view of a first portion of an illustrative tunable lens with a rigid frame and an adjustable fluid-filled bladder having a stiffening portion extending in a horizontal direction in accordance with some embodiments.
Figure 21B:
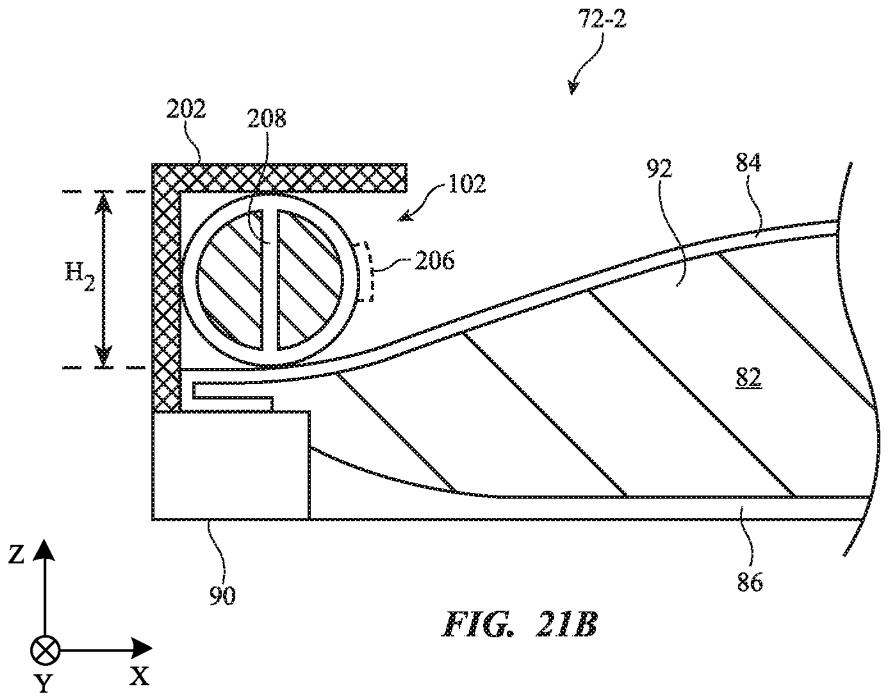
FIG. 21B is a cross-sectional side view of a second portion of the illustrative tunable lens of FIG. 21A with an adjustable fluid-filled bladder having a stiffening portion extending in a vertical direction in accordance with some embodiments.

FIGS. 21A and 21B are cross-sectional side views of different portions of a single fluid-filled bladder 102. At a constant fluid pressure, a first portion of the fluid-filled bladder may have a first height $H_1$ in the Z-direction (as shown in FIG. 21A) while a second portion of the fluid-filled bladder may have a second height $H_2$ in the Z-direction (as shown in FIG. 21B). In the example of FIGS. 21A and 21B, $H_2$ is greater than $H_1$. In general, the height of the fluid-filled bladder may vary in any desired manner across the length of the fluid-filled bladder.

There are many ways in which the fluid-filled bladder may be varied along its length to cause non-uniform heights at the same fluid pressure. As one example, the wall thickness 204 (shown in FIG. 21A) of the fluid-filled bladder may be varied to vary the stiffness of the fluid-filled bladder. The wall thickness may be uniform for a given cross-section of the fluid-filled bladder but the wall thickness may vary across the length of the fluid-filled bladder. Instead or in addition, the wall thickness may be non-uniform within a given cross-section of the fluid-filled bladder.

Instead or in addition to varying wall thickness, a stiff material that is different from the material used to form fluid-filled bladder 102 may be selectively bonded to fluid-filled bladder 102 to selectively increase the stiffness of the fluid-filled bladder along the length of the fluid-filled bladder. FIG. 21B shows an optional stiffening material 206 that is bonded to a portion of fluid-filled bladder 102. Stiffening material 206 may have a higher Young's modulus than the material of fluid-filled bladder 102.

Instead or in addition to the aforementioned techniques, fluid-filled bladder 102 may include one or more internal stiffening portions. FIGS. 21A and 21B show examples where the fluid-filled bladder 102 includes an internal stiffening portion 208 (sometimes referred to as stiffening portion 208, stiffener 208, etc.). The internal stiffening portion 208 extends through an interior cavity of the fluid-filled bladder (e.g., to divide the fluid-filled bladder into two chambers of approximately equal volume). In FIG. 21A, the stiffening portion 208 is parallel to the horizontal portion of frame 202 (and therefore the X-axis). In this arrangement the stiffening portion tends to maintain the size of the fluid-filled bladder along the X-direction and therefore changes in the fluid pressure mainly impact the size of the fluid-filled bladder along the Z-direction.

In FIG. 21B, the stiffening portion 208 is parallel to the vertical portion of frame 202 (and therefore the Z-axis). In this arrangement the stiffening portion tends to maintain the size of the fluid-filled bladder along the Z-direction and therefore changes in the fluid pressure mainly impact the size of the fluid-filled bladder along the X-direction.

With the stiffening portion 208 having the arrangement of FIGS. 21A and 21B in a single fluid-filled bladder 102, the fluid-filled bladder has a greater height in FIG. 21B than in FIG. 21A. In general, the direction of the stiffening portion may be changed along the length of the fluid-filled bladder to cause the height of the bladder to vary at constant fluid pressure.

FIG. 21A shows how stiffening portion 208 may have one or more openings 210 to ensure uniform fluid pressure on both sides of the stiffening portion within the fluid-filled bladder 102.

FIGS. 21A and 21B show examples where stiffening portion 208 is formed integrally with fluid-filled bladder 102. In other words, the stiffening portion may be formed from the same material as fluid-filled bladder 102 and/or formed at the same manufacturing step as fluid-filled bladder 102.

In the example of FIGS. 19, 20, 21A, and 21B, no lens shaping element 104 is shown in adjustable lens 72-2. This example is merely illustrative. If desired, an adjustable lens with a rigid frame 202 may also include a lens shaping element 104. For example, the lens shaping element 104 may be interposed between fluid-filled bladder 102 and lens element 84 in FIGS. 19, 20, 21A, and 21B and/or the lens element 84 may be interposed between fluid-filled bladder 102 and a lens shaping element 104 in FIGS. 19, 20, 21A, and 21B.

Figure 22:
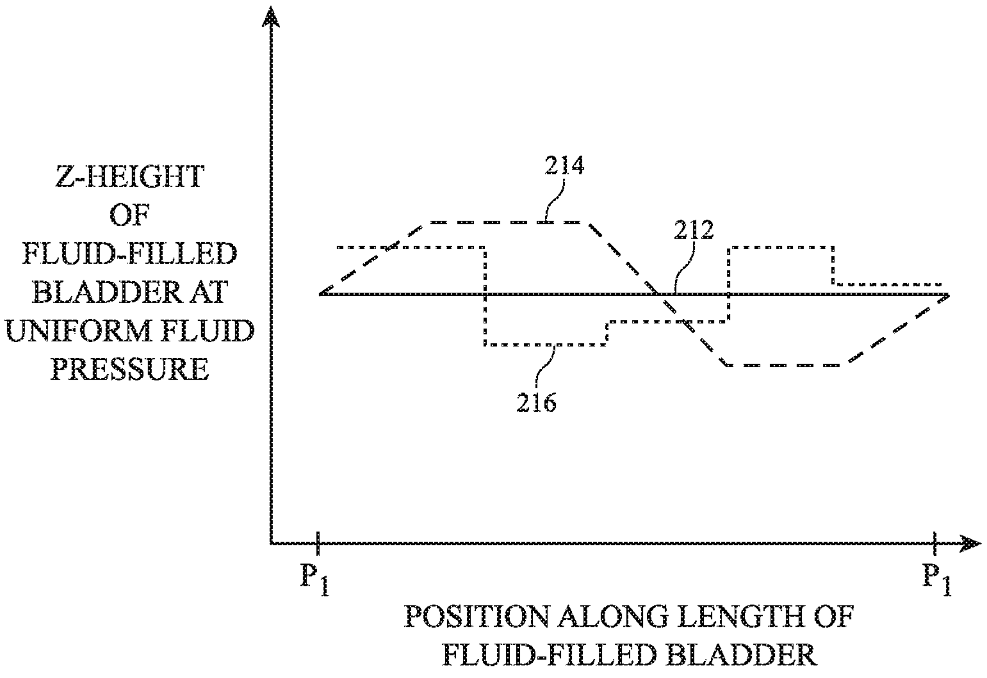
FIG. 22 is a graph of illustrative profiles for Z-height of the fluid-filled bladder at uniform fluid pressure as a function of position along the length of the fluid-filled bladder in accordance with some embodiments.

FIG. 22 is a graph of illustrative profiles for the Z-height of the fluid-filled bladder at uniform fluid pressure as a function of position along the length of the fluid-filled bladder. FIG. 22 shows profiles extending along the entire length of the fluid-filled bladder around the periphery of the adjustable lens element (e.g., starting and ending at the same point $P_1$). FIG. 22 shows a first profile 212 where the Z-height is uniform along the entire length of the fluid-filled bladder. In contrast, profiles 214 and 216 show embodiments where the Z-height varies along the length of the fluid-filled bladder. Profile 214 shows how the Z-height may change gradually between different heights. Profile 216 shows a different embodiment where the Z-height changes according to a step function. In general, the profiles may follow any desired shapes.

Figure 23A:
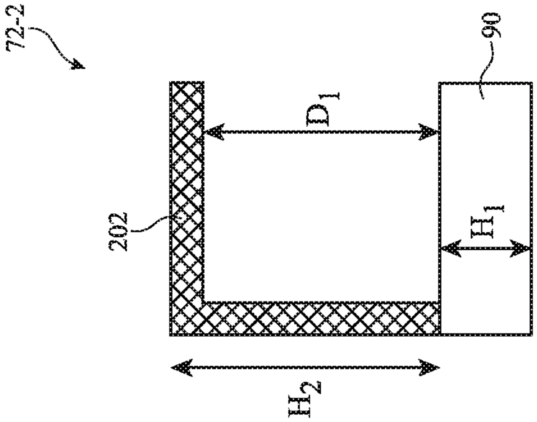
FIGS. 23A-23C are side views of a tunable lens showing how the height of a rigid frame and/or the thickness of a chassis may vary along the periphery of the tunable lens in accordance with some embodiments.

Instead or in addition to varying the Z-height of the fluid-filled bladder at uniform fluid pressure, the height of rigid frame 202 and/or the thickness of chassis 90 may vary along the periphery of the adjustable lens to cause displacement of lens element 84 to vary at uniform fluid pressure in fluid-filled bladder 102. FIG. 23A shows a first portion of adjustable lens element 72-2 where chassis 90 has a first height $H_1$, rigid frame 202 has a second height $H_2$, and there is a displacement $D_1$ between the horizontal portion of rigid frame 202 and the upper surface of chassis 90.

Figure 23B:
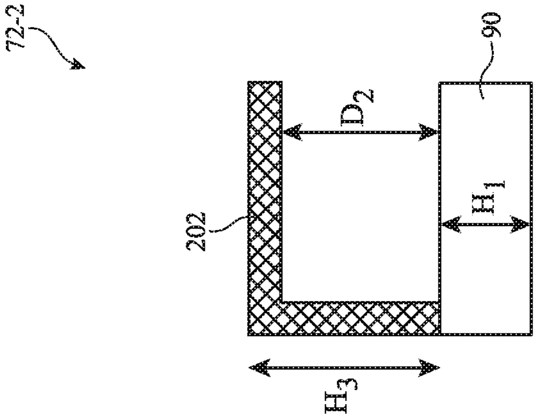

FIG. 23B shows a second portion of adjustable lens element 72-2 where chassis 90 has the first height $H_1$ (e.g., the same height as in FIG. 23A), rigid frame 202 has a third height $H_3$ (e.g., a different height than in FIG. 23A), and there is a displacement $D_2$ between the horizontal portion of rigid frame 202 and the upper surface of chassis 90. Because $H_3$ is less than $H_2$, displacement $D_2$ in FIG. 23B is less than displacement $D_1$ from FIG. 23A.

Figure 23C:
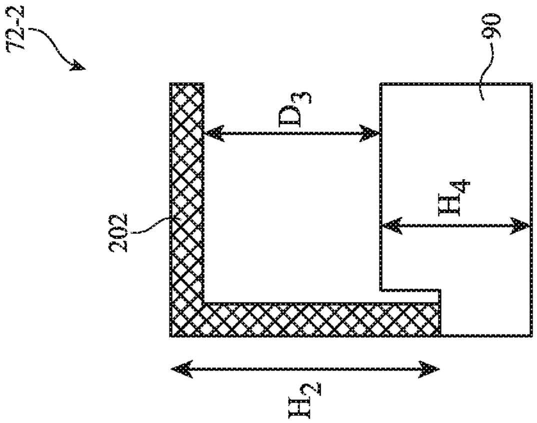

FIG. 23C shows a third portion of adjustable lens element 72-2 where chassis 90 has a fourth height $H_4$ (e.g., a different height than in FIGS. 23A and 23B), rigid frame 202 has the second height (e.g., the same height as in FIG. 23A), and there is a displacement $D_3$ between the horizontal portion of rigid frame 202 and the upper surface of chassis 90. Because $H_4$ is greater than $H_1$, displacement $D_3$ in FIG. 23C is less than displacement $D_1$ from FIG. 23A.

Figure 24:
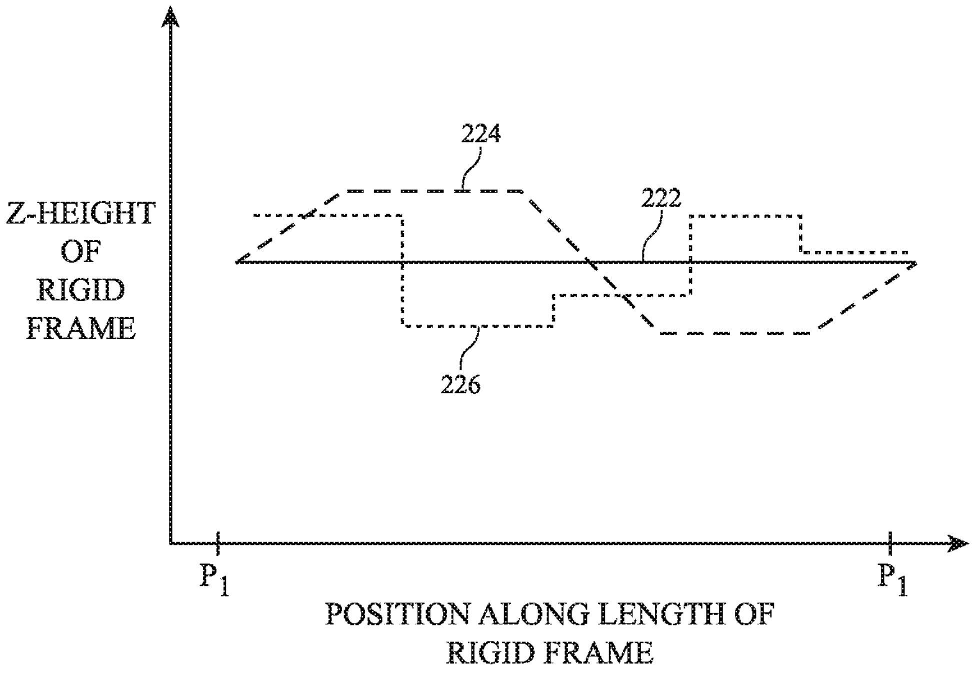
FIG. 24 is a graph of illustrative profiles for Z-height of the rigid frame as a function of position along the length of the rigid frame in accordance with some embodiments.

FIG. 24 is a graph of illustrative profiles for the Z-height of the rigid frame as a function of position along the length of the rigid frame. FIG. 24 shows profiles extending along the entire length of the rigid frame around the periphery of the adjustable lens element (e.g., starting and ending at the same point $P_1$). FIG. 24 shows a first profile 222 where the Z-height is uniform along the entire length of the rigid frame. In contrast, profiles 224 and 226 show options where the Z-height varies along the length of the rigid frame. Profile 224 shows how the Z-height may change gradually between different heights. Profile 226 shows a different option where the Z-height changes according to a step function. In general, the profiles may follow any desired shapes.

Figure 25:
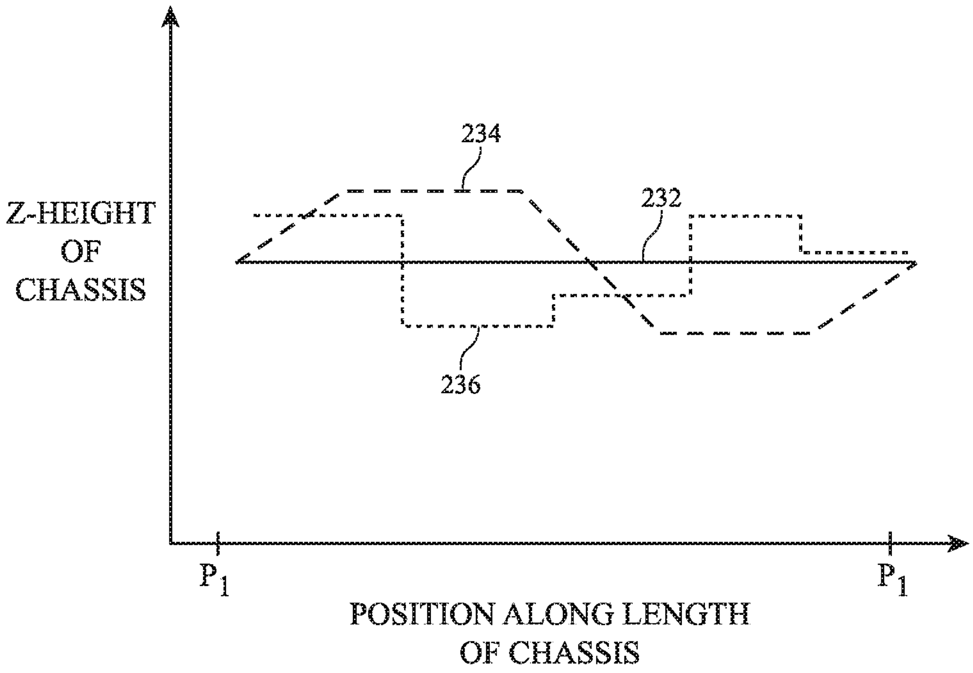
FIG. 25 is a graph of illustrative profiles for Z-height of the chassis as a function of position along the length of the chassis in accordance with some embodiments.

FIG. 25 is a graph of illustrative profiles for the Z-height of the chassis as a function of position along the length of the chassis. FIG. 25 shows profiles extending along the entire length of the chassis around the periphery of the adjustable lens element (e.g., starting and ending at the same point $P_1$). FIG. 25 shows a first profile 232 where the Z-height is uniform along the entire length of the chassis. In contrast, profiles 234 and 236 show options where the Z-height varies along the length of the chassis. Profile 234 shows how the Z-height may change gradually between different heights. Profile 236 shows a different option where the Z-height changes according to a step function. In general, the profiles may follow any desired shapes.

Figure 26:
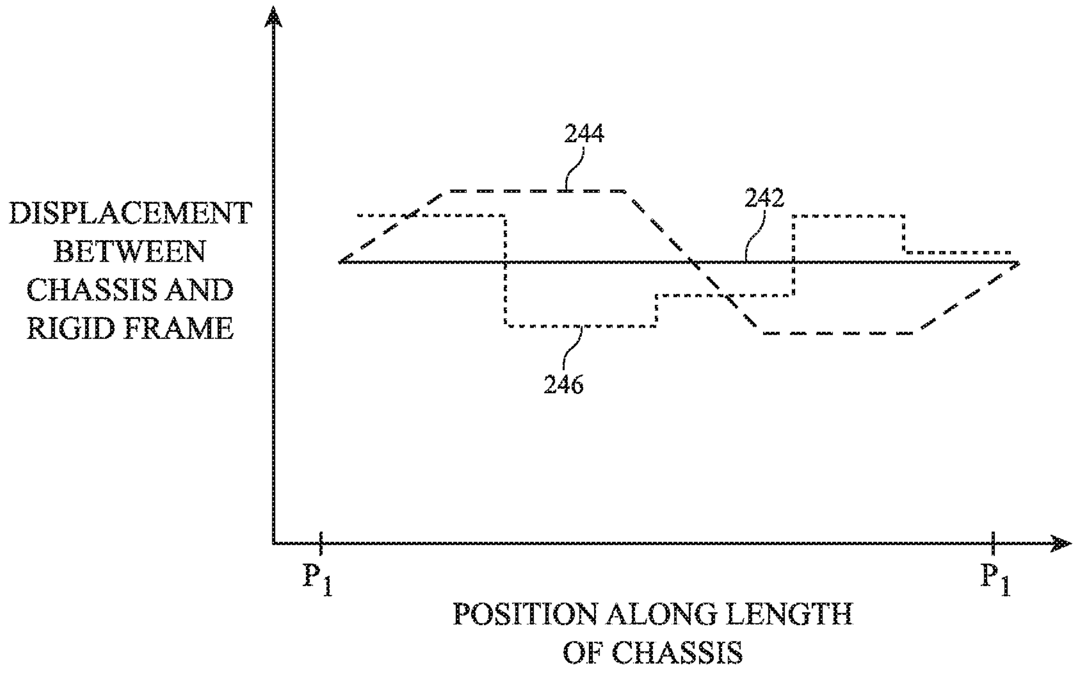
FIG. 26 is a graph of illustrative profiles for displacement between the chassis and the rigid frame as a function of position along the length of the chassis in accordance with some embodiments.

FIG. 26 is a graph of illustrative profiles for the displacement between the chassis and rigid frame as a function of position along the length of the chassis. The changes in displacement may be achieved by varying the Z-height of rigid frame 202 and/or chassis 90. FIG. 26 shows profiles extending along the entire length of the chassis around the periphery of the adjustable lens element (e.g., starting and ending at the same point $P_1$). FIG. 26 shows a first profile 242 where the displacement is uniform along the entire length of the chassis. In contrast, profiles 244 and 246 show options where the displacement varies along the length of the chassis. Profile 244 shows how the displacement may change gradually between different heights. Profile 246 shows a different option where the displacement changes according to a step function. In general, the profiles may follow any desired shapes.

If desired, chassis 90, rigid frame 202, fluid-filled bladder 102, and fluid 108 in the fluid-filled bladder may all be transparent (e.g., with a transparency that is greater than 70%, greater than 80%, greater than 90%, greater than 95%, etc.) to mitigate the apparent bezel size of tunable lens 72-2.

The foregoing is merely illustrative and various modifications can be made to the described embodiments. The foregoing embodiments may be implemented individually or in any combination.

What is claimed is:

1. A tunable lens having a periphery, the tunable lens comprising:

a first lens element;

a second lens element;

a fluid-filled chamber that is interposed between the first and second lens elements;

a plurality of adjustable fluid-filled bladders that are distributed around the periphery, wherein each adjustable fluid-filled bladder is configured to selectively adjust a displacement of the first lens element relative to the second lens element at a respective position along the periphery; and a plurality of fluid-controlling components, wherein each fluid-controlling component of the plurality of fluid-controlling components is configured to adjust a respective amount of fluid in a respective adjustable fluid-filled bladder of the plurality of adjustable fluid-filled bladders.

2. The tunable lens defined in claim 1, wherein the first lens element is an elastomeric lens element and wherein the second lens element is a rigid lens element.

3. The tunable lens defined in claim 1, wherein each fluid-controlling component of the plurality of fluid-controlling components is selected from the group consisting of: a pump, a stepper motor, a piezoelectric actuator, shape memory alloy, a motor, a hydraulic actuator, and a linear electromagnetic actuator.

4. The tunable lens defined in claim 1, further comprising:

a fluid in the fluid-filled chamber, wherein the fluid directly contacts the first lens element, the second lens element, and the plurality of adjustable fluid-filled bladders; and an additional fluid-controlling component that is configured to adjust an amount of the fluid in the fluid-filled chamber.

5. The tunable lens defined in claim 4, wherein each adjustable fluid-filled bladder is configured to selectively adjust the displacement of the first lens element relative to the second lens element in a direction, the tunable lens further comprising:

non-adjustable components that are distributed around the periphery, wherein each non-adjustable component is configured to maintain a respective fixed displacement of the first lens element relative to the second lens element in the direction and at a respective position along the periphery, and wherein the additional fluid-controlling component is configured to adjust the amount of the fluid in the fluid-filled chamber.

6. The tunable lens defined in claim 1, wherein each adjustable fluid-filled bladder has an associated respective inlet, the tunable lens further comprising:

a plurality of fluid channels, wherein each fluid-controlling component of the plurality of fluid-controlling components is configured to provide the respective amount of fluid to the respective adjustable fluid-filled bladder of the plurality of adjustable fluid-filled bladders through its respective inlet and a respective fluid channel of the plurality of fluid channels 4.

7. The tunable lens defined in claim 1, further comprising:

a chassis with a first portion that extends in a ring around the periphery and a second portion that extends away from the first portion.

8. The tunable lens defined in claim 7, wherein the plurality of fluid-controlling components is positioned on the second portion of the chassis.

9. The tunable lens defined in claim 8, wherein the first portion of the chassis comprises a plurality of channels and wherein each channel of the plurality of channels is interposed between a respective fluid-controlling component of the plurality of fluid-controlling components and a respective adjustable fluid-filled bladder of the plurality of adjustable fluid-filled bladders.

10. The tunable lens defined in claim 1, wherein the plurality of adjustable fluid-filled bladders is configured to adjust a shape of the first lens element, the tunable lens further comprising:

a positioner that is configured to adjust a position of the second lens element relative to the first lens element, wherein the positioner is configured to adjust the position of the second lens element relative to the first lens element to cause the displacement of the first lens element relative to the second lens element to remain fixed at one or more positions along the periphery.

11. A tunable lens having a periphery, the tunable lens comprising:

a first lens element;

a second lens element;

a fluid-filled chamber that is interposed between the first and second lens elements; and a single fluid-filled bladder that extends around the entire periphery, wherein the single fluid-filled bladder is configured to selectively adjust a displacement of the first lens element relative to the second lens element, wherein the single fluid-filled bladder has a first stiffness at a first position along the periphery and a second stiffness different than the first stiffness at a second position along the periphery, and wherein, at uniform fluid pressure, the single fluid-filled bladder has a first height at the first position and a second height different than the first height at the second position.

12. The tunable lens defined in claim 11, further comprising:

a lens shaping element that is attached to the first lens element.

13. The tunable lens defined in claim 11, further comprising:

a chassis that extends in a ring around the periphery; and a rigid frame attached to the chassis, wherein the single fluid-filled bladder is interposed between the chassis and at least a portion of the rigid frame and wherein a displacement between the rigid frame and the chassis varies along the periphery.

14. The tunable lens defined in claim 13, wherein the rigid frame comprises first and second orthogonal portions, wherein the first portion is orthogonal to an upper surface of the chassis, wherein the second portion is parallel to the upper surface of the chassis, and wherein the single fluid-filled bladder is interposed between the chassis and the second portion of the rigid frame.

15. The tunable lens defined in claim 13, wherein the first lens element is attached to the single fluid-filled bladder, the rigid frame, and the chassis.

16. The tunable lens defined in claim 13, wherein the first lens element has a portion that is interposed between the rigid frame and at least a portion of the chassis.

17. The tunable lens defined in claim 11, wherein the single fluid-filled bladder comprises a material with a first Young's modulus, the tunable lens further comprising:

a stiffening material bonded to the single fluid-filled bladder at the first position, wherein the stiffening material has a second Young's modulus higher than the first Young's modulus.

18. The tunable lens defined in claim 11, wherein the single fluid-filled bladder has a first wall thickness at the first position and a second wall thickness different than the first wall thickness at the second position.

19. The tunable lens defined in claim 11, wherein the single fluid-filled bladder has an internal stiffening portion and wherein the internal stiffening portion extends in a first direction at the first position and extends in a second direction that is different from the first direction at the second position.

20. A tunable lens having a periphery, the tunable lens comprising:

a lens element that forms part of a fluid-filled chamber;

a chassis that extends in a ring around the periphery;

actuators positioned along the periphery between the chassis and the lens element, wherein each actuator is configured to adjust a respective displacement between the chassis and the lens element in a direction and at a respective position along the periphery;

non-adjustable components positioned along the periphery between the chassis and the lens element, wherein each non-adjustable component is configured to maintain a respective fixed displacement between the chassis and the lens element in the direction and at a respective position along the periphery; and a fluid-controlling component that is configured to adjust an amount of fluid in the fluid-filled chamber to adjust a shape of the lens element.

21. The tunable lens defined in claim 20, wherein the fluid-controlling component comprises a flexible bladder with ribs and a scissor jack that is configured to change a volume of the flexible bladder.

* * * * *